United States Patent
Kim et al.

(10) Patent No.: US 10,628,550 B2
(45) Date of Patent: Apr. 21, 2020

(54) METHOD FOR DESIGNING AN INTEGRATED CIRCUIT, AND METHOD OF MANUFACTURING THE INTEGRATED CIRCUIT

(71) Applicant: SAMSUNG ELECTRONICS CO., LTD., Suwon-si, Gyeonggi-Do (KR)

(72) Inventors: Min-su Kim, Suwon-si (KR); Yong-seok Lee, Hwaseong-si (KR); Han-shin Shin, Yongin-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 25 days.

(21) Appl. No.: 15/971,079

(22) Filed: May 4, 2018

(65) Prior Publication Data
US 2018/0336307 A1   Nov. 22, 2018

(30) Foreign Application Priority Data

May 19, 2017  (KR) .................. 10-2017-0062230
Aug. 10, 2017  (KR) .................. 10-2017-0101871

(51) Int. Cl.
*G06F 17/50* (2006.01)
*G03F 1/36* (2012.01)

(52) U.S. Cl.
CPC ............ *G06F 17/5081* (2013.01); *G03F 1/36* (2013.01); *G06F 17/504* (2013.01); *G06F 17/505* (2013.01); *G06F 2217/74* (2013.01)

(58) Field of Classification Search
CPC .............. G06F 17/505; G06F 17/5045; G06F 17/5068; G06F 17/5072; G06F 17/5081
USPC .................................... 716/103–104, 106, 111
See application file for complete search history.

(56) References Cited

U.S. PATENT DOCUMENTS

| | | | |
|---|---|---|---|
| 5,581,475 A | 12/1996 | Majors | |
| 5,943,487 A | 8/1999 | Messerman et al. | |
| 6,167,555 A | 12/2000 | Lakos | |
| 6,289,116 B1 | 9/2001 | Chamberlain et al. | |
| 6,637,013 B1 | 10/2003 | Li | |
| 9,292,652 B2 | 3/2016 | Aggarwal et al. | |
| 9,342,649 B2 | 5/2016 | Morishita et al. | |
| 2004/0019861 A1* | 1/2004 | Li | G06F 17/5068 716/120 |
| 2005/0257183 A1* | 11/2005 | Lo | G06F 17/5081 716/118 |
| 2006/0200789 A1 | 9/2006 | Rittman | |
| 2008/0005713 A1* | 1/2008 | Singh | G06F 17/5045 716/102 |
| 2013/0086541 A1* | 4/2013 | Luo | G06F 17/5081 716/112 |
| 2013/0305194 A1* | 11/2013 | Wang | G06F 17/5081 716/52 |

(Continued)

*Primary Examiner* — Paul Dinh
(74) *Attorney, Agent, or Firm* — F. Chau & Associates, LLC

(57) ABSTRACT

A method of manufacturing an IC includes detecting connectivity between polygons from layout data of the IC and extracting a layout netlist, by performing a DRC on the layout data. The DRC includes loading a rule file including a DRC syntax. The method includes performing LVS verification on the extracted layout netlist and schematic data of the IC to generate LVS result data. The method includes manufacturing the IC according to a layout based on the layout data and the LVS result data.

20 Claims, 29 Drawing Sheets

(56) References Cited

U.S. PATENT DOCUMENTS

2014/0001564 A1\* 1/2014 Song .................. G06F 17/5081
    257/369
2014/0282344 A1\* 9/2014 Hsu .................... G06F 17/5072
    716/123

\* cited by examiner

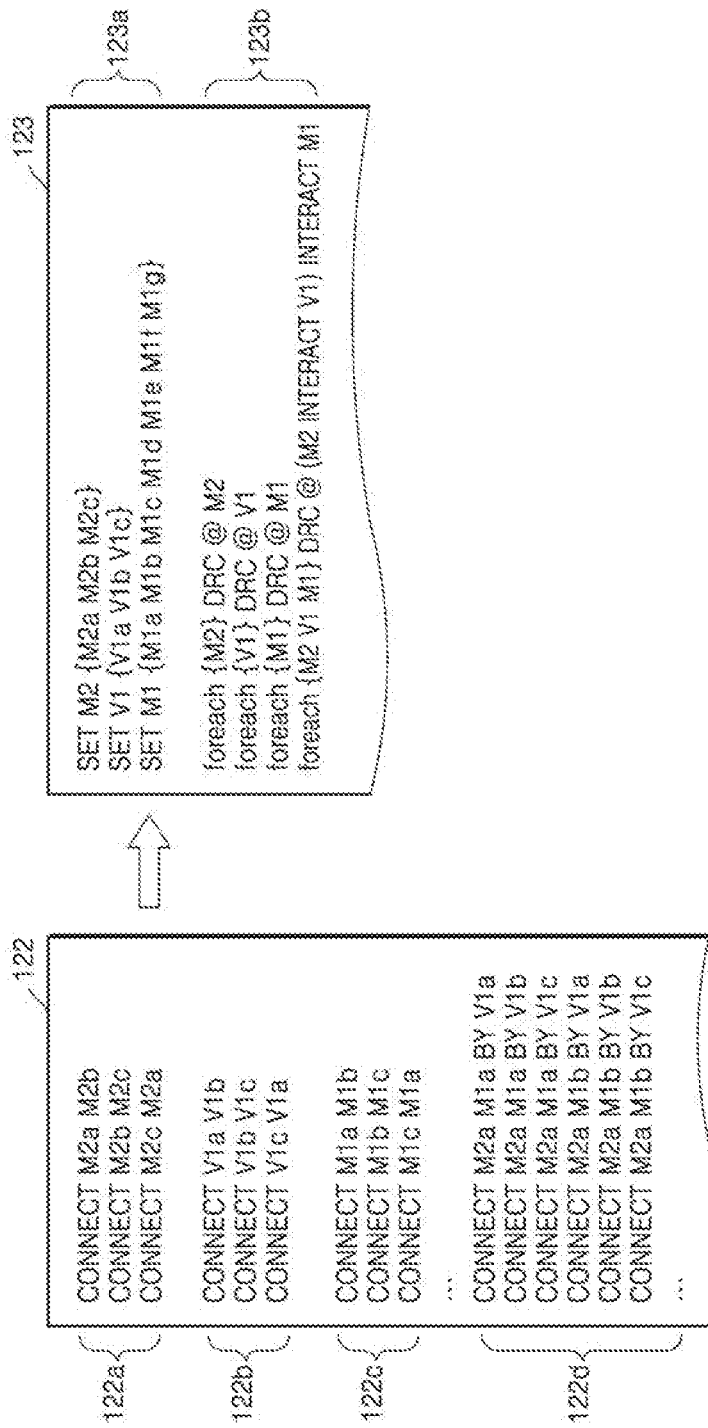

FIG. 13

```
set mlist(m2) {M2a  M2b  M2c}
    set vlist(v1) {V1a  V1b  V1c}
set mlist(m1) {M1a  M1b  M1c  M1d  M1e  M1f  M1g} foreach v { {m2 v1 m1} } {
    set a1 [lindex $v 0]
    set a2 [lindex $v 1]
    set a3 [lindex $v 2]
    set mtop $mlist($a1)
    set via $vlist($a2)
    set btop $mlist($a3)
    set y 1
    foreach elemtop $mtop {
        foreach elevia $via {
            foreach elebtop $btop {
                tvf::VERBATIM "$a1.$a2.$a3.$y \{"
                tvf::VERBATIM "    \@ CONNECT $elemtop $elebtop BY $elevia"
                tvf::VERBATIM "        ($elevia INTERACT $elemtop) INTERACT $elebtop"
                tvf::VERBATIM "    \}"
                incr y                                           }}}}
```

METHOD FOR DESIGNING AN INTEGRATED CIRCUIT, AND METHOD OF MANUFACTURING THE INTEGRATED CIRCUIT

CROSS-REFERENCE TO RELATED APPLICATIONS

This application claims priority under 35 U.S.C. § 119 to Korean Patent Application No. 10-2017-0062230, filed on May 19, 2017, and Korean Patent Application No. 10-2017-0101871, filed on Aug. 10, 2017, in the Korean Intellectual Property Office, the disclosures of which are incorporated by reference herein in their entireties.

TECHNICAL FIELD

Exemplary embodiments of the present inventive concept relate to integrated circuits (ICs), and more particularly, to a method for designing an integrated circuit and a method of manufacturing the integrated circuit.

DISCUSSION OF RELATED ART

ICs may be defined by schematic data regarding various devices, such as a transistor, a resistor, and a diode. Layout data of an IC may be generated based on schematic data, and may include a plurality of polygons. A layout-versus-schematic (LVS) verification may be performed to verify whether the layout data is identical to the schematic data. For example, in the LVS verification, it may be verified whether a net, a device, and a parameter of the layout data are identical to those of the schematic data. The net may correspond to a single interconnection in the layout of an IC, and the single interconnection may correspond to a layout structure including metal layers and vias electrically connected to each other. In the conventional art, connectivity patterns greatly increase as patterns of a semiconductor device become miniaturized, and thus an LVS tool might not properly operate, may operate slowly or may operate with a relatively high level of errors occurring.

SUMMARY

According to an exemplary embodiment of the present inventive concept, a method of manufacturing an IC includes detecting connectivity between polygons from layout data of the IC, based on a rule file including design rule check (DRC) syntax. The method includes detecting actually-connected polygons in the layout data based on the rule file including the DRC syntax. The method includes extracting a layout netlist, by performing a design rule check (DRC) on the layout data by using the detected connectivity between actually-connected polygons. The method includes performing Layout-Versus-Schematic (LVS) verification on the extracted layout netlist and schematic data of the IC to generate LVS result data. The method includes manufacturing the IC according to a layout based on the layout data and the LVS result data.

According to an exemplary embodiment of the present inventive concept, a computer-implemented method of designing an integrated circuit (IC), includes detecting connectivity between polygons from layout data of the IC, based on a rule file including design rule check (DRC) syntax, by a processor. The method includes detecting actually-connected polygons in the layout data based on the rule file, by the processor. The method includes extracting a layout netlist from the layout data by using the detected connectivity between the actually connected polygons, by the processor. The method includes performing Layout-Versus-Schematic (LVS) verification on the IC to generate LVS result data, by comparing schematic data of the IC with the layout netlist, by the processor.

According to an exemplary embodiment of the present inventive concept, a computing system for designing an IC includes a memory configured to store a LVS engine for performing LVS verification on the IC. A processor is configured to access the memory and execute the LVS engine. The LVS engine detects connectivity between polygons from layout data of the IC, based on a rule file including DRC syntax, extracts a layout netlist from the layout data by using the detected connectivity, and compares the extracted layout netlist with schematic data of the IC.

BRIEF DESCRIPTION OF THE DRAWINGS

The above and other features of the inventive concept will become more apparent by describing in detail exemplary embodiments thereof, with reference to the accompanying drawing, in which:

FIG. 12B illustrates a rule file according to an exemplary embodiment of the present inventive concept;

FIG. 13 illustrates an example of a rule file according to an exemplary embodiment of the present inventive concept;

DETAILED DESCRIPTION OF THE EMBODIMENTS

The inventive concept will be described in more detail below with reference to the accompanying drawings, in which example embodiments of the inventive concept are shown.

Figure 1:
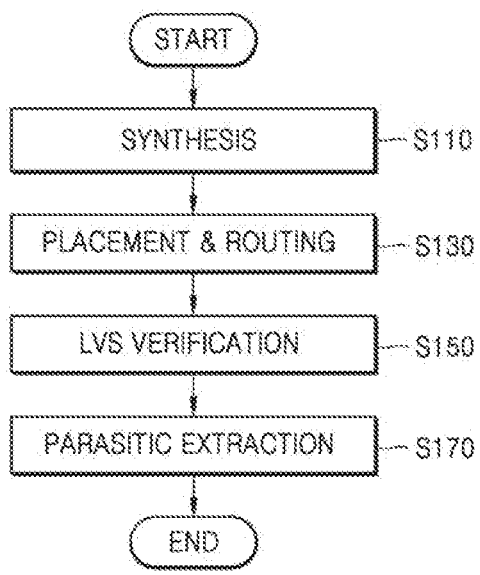
FIG. 1 is a flowchart of a method of designing an integrated circuit (IC), according to an exemplary embodiment of the present inventive concept.

FIG. 1 is a flowchart of a method of designing an integrated circuit (IC), according to an exemplary embodiment of the present inventive concept.

Referring to FIG. 1, a method (e.g., a computer-implemented method) of designing an IC includes an operation of designing and verifying a layout of the IC, and may be performed using a tool for designing an IC. The tool for designing an IC may be a program or software module including a plurality of instructions executed by a processor, and may be stored in a computer-readable storage medium. For example, the program or software may be stored in a non-transitory computer-readable storage medium. Accordingly, the IC designing method may be referred to as a computer-implemented method of designing an IC.

In operation S110 (SYNTHESIS), a netlist having a gate level may be generated by synthesizing input data defined on a register transfer level (RTL) for the IC by using a standard cell library. For example, operation S110 may be performed by a processor by using a synthesis tool. In operation S130 (PLACEMENT & ROUTING), placement & routing (which may be referred to herein as "P&R") are performed on standard cells that define the IC, according to the netlist, thus generating layout data of the IC. For example, operation S130 may be performed by the processor by using a P&R tool. For example, the layout data may be data in a Graphic Design System (GDS) or GDSII format.

In operation S150 (LVS VERIFICATION), a layout-versus-schematic (LVS) verification is performed on the IC, thus generating LVS result data. For example, operation S150 may be performed by the processor by using an LVS verification tool. For example, connectivity between polygons may be automatically detected from the layout data by performing a design rule check (DRC) operation on the layout data, and the LVS verification may be performed using the detected connectivity. The LVS verification may refer to an operation of verifying whether schematic data of the IC is identical to the layout data of the IC. According to an exemplary embodiment of the present inventive concept, the schematic data and the layout data may be provided as an input file to the LVS verification tool, and the LVS result data may be output as an output file from the LVS verification tool.

In operation S170 (PARASITIC EXTRACTION), a parasitic component is extracted from the layout data to thus generate parasitic component data. For example, operation S170 may be performed by the processor by using a parasitic extraction (PEX) tool. For example, the parasitic component data may be generated as a standard parasitic extraction format (SPEF) file. According to an exemplary embodiment of the present inventive concept, the layout data may be provided as an input file to the PEX tool, and the SPEF file may be output as an output file from the P&R tool.

In the conventional art, a developer may define connectivity information of a layout design, and thus the connectivity information may be omitted due to a mistake made by the developer. In addition, because the amount of connectivity information greatly increases as patterns of a semiconductor device become miniaturized, an LVS tool might not properly operate, may operate slowly or may operate with a relatively high level of errors occurring.

According to an exemplary embodiment of the present inventive concept, connectivity between polygons may be automatically detected from layout data, for example, based on a rule file including DRC syntax, and LVS verification may be performed using the detected connectivity. Accordingly, only essential connectivity included in the layout data may be detected, and thus the size of data corresponding to connectivity information may be reduced. In addition, because an operation in which a designer directly describes connectivity may be omitted, an LVS coding time period may be shortened, and simultaneously, an execution time period of LVS verification may not increase. Additionally, the DRC syntax may be implemented as a DRC loop syntax by using a loop algorithm, and accordingly, even when the number of polygons in a layout increases due to the miniaturization of a semiconductor process, omission of connective information may be prevented.

Thus, a computer-implemented method of designing an integrated circuit (IC) according to an exemplary embodiment of the present inventive concept may increase the speed and efficiency with which LVS verification is performed. Additionally, an occurrence of errors in an LVS verification process may be reduced or eliminated, thus improving the functionality of a computer-implemented IC design including the functioning of an LVS verification tool. Increased speed/efficiency and a reduced occurrence of errors in LVS verification in designing an IC may thus lead to a cost reduction in manufacturing an IC chip through increased efficiency in the computer-implemented LVS verification process described herein.

Figure 2:
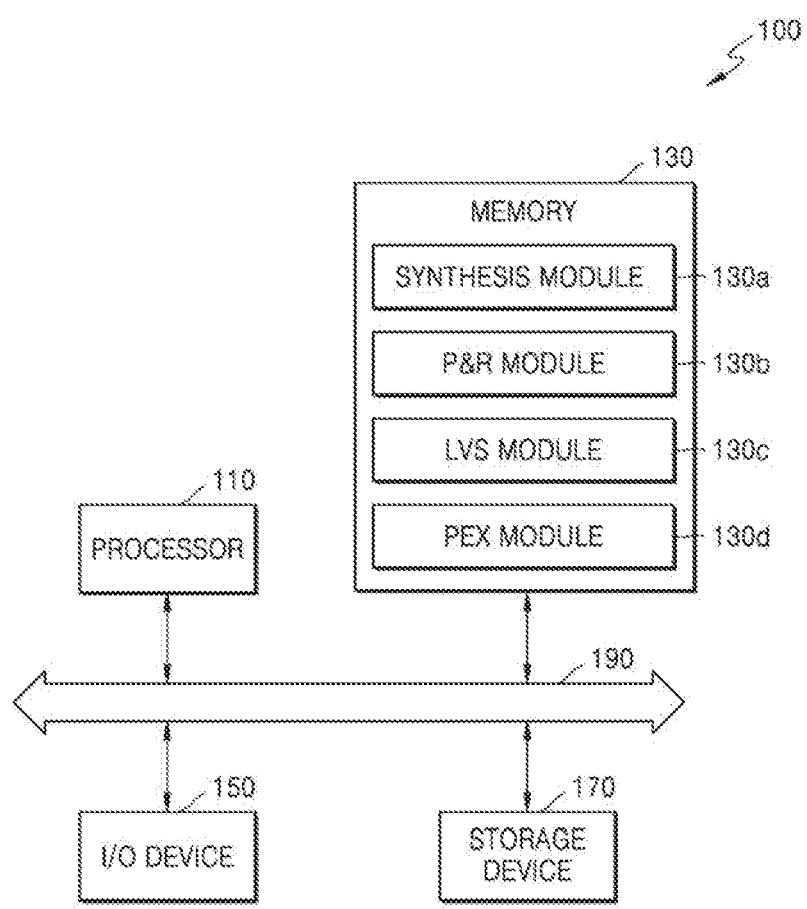
FIG. 2 is a block diagram of a computing system for designing an IC, according to an exemplary embodiment of the present inventive concept.

FIG. 2 is a block diagram of a computing system for designing an IC, according to an exemplary embodiment of the present inventive concept.

Referring to FIG. 2, a computing system 100 for designing an IC (which may be referred to herein as an IC design system 100) may include a processor 110, a memory 130, an input/output (I/O) device 150, a storage device 170, and a bus 190. The IC design system 100 may perform an IC design operation including operations S110, S130, S150 and S170 described in more detail above with reference to FIG. 1. According to an exemplary embodiment of the present inventive concept, the IC design system 100 may be implemented using an incorporated device, and accordingly, may be referred to as an IC design device. The IC design system 100 may be provided as a dedicated device (e.g., an autonomous, special purpose device) for designing an IC of a semiconductor device, or may be a computer (e.g., a general purpose computer operating as a special purpose computer according to the algorithms described herein) for driving various simulation tools or design tools.

The processor 110 may be configured to execute instructions for performing at least one of various operations for designing the IC. The processor 110 may communicate with the memory 130, the I/O device 150, and the storage device 170 via the bus 190. The processor 110 may perform an IC design operation by driving a synthesis module 130*a*, a P&R module 130*b*, an LVS module 130*c*, and a PEX module 130*d* loaded in the memory 130.

The memory 130 may store the synthesis module 130*a*, the P&R module 130*b*, the LVS module 130*c*, and the PEX module 130*d*. The synthesis module 130*a*, the P&R module 130*b*, the LVS module 130*c*, and the PEX module 130*d* may be loaded from the storage device 170 to the memory 130. The synthesis module 130*a* may be, for example, a program including a plurality of instructions for performing a logic synthesis operation according to operation S110 (see, e.g., FIG. 1). The P&R module 130*b* may be, for example, a program including a plurality of instructions for performing a P&R operation according to operation S130 (see, e.g., FIG. 1). The LVS module 130*c* may be, for example, a program including a plurality of instructions for performing an LVS verification operation according to operation S150 (see, e.g., FIG. 1). The PEX module 130*d* may be, for example, a program including a plurality of instructions for performing a parasitic extraction operation according to operation S170 (see, e.g., FIG. 1). The memory 130 may be a volatile memory, such as SRAM or DRAM, or may be a non-volatile memory, such as, PRAM, MRAM, ReRAM, FRAM, or NOR flash memory.

The I/O device 150 may control a user input and an output from user interface devices. For example, the I/O device 150 may include input devices, such as a keyboard, a mouse, or a touch pad, and may receive input data that defines the IC. For example, the I/O device 150 may include output devices, such as a display or a speaker, and may display a layout result, a routing result, a DRC result, an LVS result, or a PEX result. The storage device 170 may store various pieces of data related with the synthesis module 130*a*, the P&R module 130*b*, the LVS module 130*c*, and the PEX module 130*d*. The storage device 170 may include a memory card (MMC, eMMC, SD, MicroSD, or the like), a solid state drive (SSD), a hard disk drive (HDD), etc.

Figure 3:
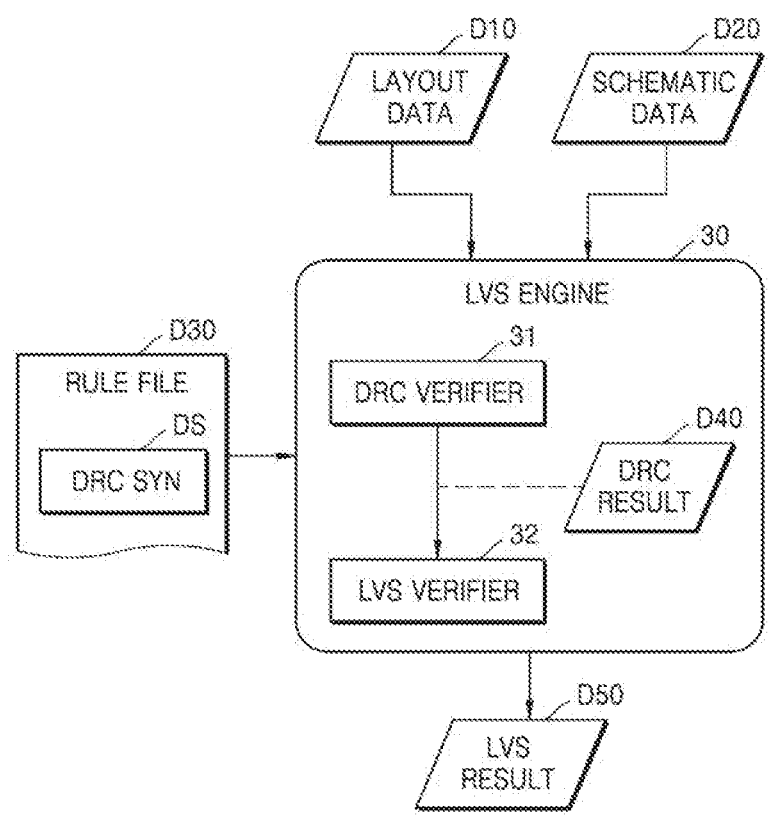
FIG. 3 is a block diagram of a Layout-Versus-Schematic (LVS) engine according to an exemplary embodiment of the present inventive concept.

FIG. 3 is a block diagram of an LVS engine according to an exemplary embodiment of the present inventive concept.

Referring to FIG. 3, the LVS engine 30 may be a program that performs an LVS verification on an IC. For example, the LVS engine 30 may correspond to an example of the LVS module 130*c* stored in the memory 130 (see, e.g., FIG. 2). The LVS engine 30 may include a plurality of procedures, such as a DRC verifier 31 and an LVS verifier 32. The procedures may refer to a series of instructions for performing a certain task, and may be referred to as functions, routines, subroutines, or subprograms. Herein, a processor (for example, the processor 110 of FIG. 2) performing an operation by executing a procedure stored in a memory (for example, the memory 130 of FIG. 2) is also expressed as the procedure of performing the operation. Thus, the LVS engine 30 described with reference to FIG. 3 above and described in more detail below includes an exemplary algorithm for performing operation S110 (see, e.g., FIG. 1), including the steps of generating a netlist having a gate level by synthesizing input data defined on a register transfer level (RTL) for the IC by using a standard cell library, which may be executed by the computing system 110 described with reference to FIG. 2 (see, e.g., synthesis module 130*a*).

The LVS engine 30 may receive layout data D10 and schematic data D20. The layout data D10 may be topological data related with the layout of the IC, or may include a plurality of polygons. Via a semiconductor manufacturing process, the IC may have a structure in which a plurality of layers are stacked, and the layout data D10 of the IC may include topological information of the plurality of layers. The plurality of layers may include a conductive layer and an insulative layer, and a device of the IC may be configured as a pattern formed on at least one layer. The plurality of layers and the plurality of patterns in the layout data D10 may be displayed as polygons. According to an exemplary embodiment of the present inventive concept, the layout data D10 may be output data of a P&R tool that performs the P&R operation corresponding to operation S130 (see, e.g., FIG. 1), but exemplary embodiments of the present inventive concept are not limited thereto. Thus, the LVS engine 30 described with reference to FIG. 3 above and described in more detail below includes an exemplary algorithm for performing operation S130 (see, e.g., FIG. 1), including the steps of performing placement & routing on standard cells that define the IC, according to the netlist, thus generating layout data of the IC, which may be executed by the computing system 110 described with reference to FIG. 2 (see, e.g., synthesis module 130*b*).

The schematic data D20 may include devices, such as a transistor, a resistor, and a diode, and may define connectivity between the devices. For example, the schematic data D20 may define devices of the IC as instances of symbols corresponding to the devices, and the instances may be connected to each other via wires. The symbols define devices that perform the same function. For example, devices, such as an NMOS transistor, a PMOS transistor, a diode, and a resistor, may be defined as a unique symbol. For example, the schematic data D20 may include a transistor-level netlist, a gate-level netlist, a cell-level netlist, or an Intellectual Property (IP)-level netlist. According to an exemplary embodiment of the present inventive concept, the schematic data D20 may be output data of a synthesis tool that performs the synthesis operation corresponding to operation S110 (see, e.g., FIG. 1), but exemplary embodiments of the present inventive concept are not limited thereto. The layout data D10 and the schematic data D20 will be described in more detail below with reference to FIGS. 4A and 4B.

Figure 4A:
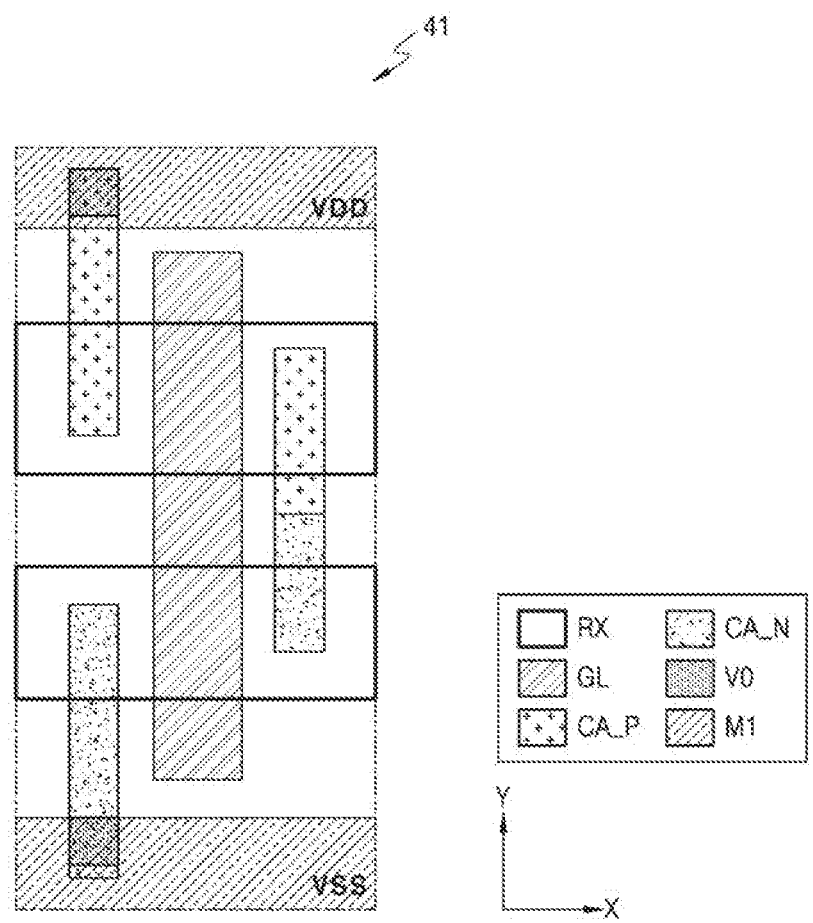
FIG. 4A illustrates an IC layout according to an exemplary embodiment of the present inventive concept.
Figure 4B:
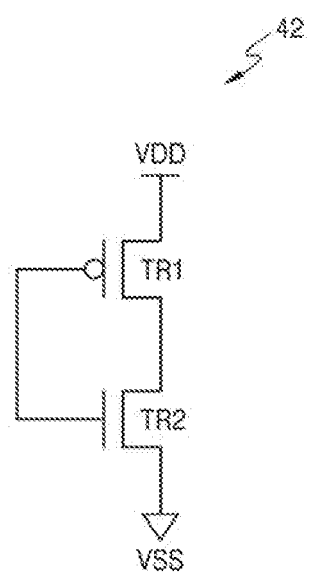
FIG. 4B illustrates an IC schematic according to an exemplary embodiment of the present inventive concept.

FIG. 4A illustrates an IC layout according to an exemplary embodiment of the present inventive concept. FIG. 4B illustrates an IC schematic according to an exemplary embodiment of the present inventive concept.

Referring to FIGS. 3, 4A, and 4B, an IC layout 41 may be defined by the layout data D10. The IC layout 41 may include an active area RX, a gate line GL, a first contact CA_N, a second contact CA_P, a via V0, and a first metal layer M1 which are respectively expressed as polygons. An IC schematic 42 may be defined by the schematic data D20. The IC schematic 42 may include a CMOS transistor including a PMOS transistor TR1 and an NMOS transistor TR2.

The layout data D10 defining the IC layout 41 may be generated according to the schematic data D20 defining the IC schematic 42. The LVS engine 30 may verify whether the instances included in the schematic data D20, for example, devices corresponding to the PMOS transistor TR1 and the NMOS transistor TR2, exist in the layout data D10. The LVS engine 30 may also verify whether an instance of the schematic data D20 and a device of the layout data D10 that correspond to each other have the same parameter, for example, the same length or width. An exemplary operation of the LVS engine 30 will be described in more detail below.

The DRC verifier 31 may generate DRC result data D40 by performing a DRC on the layout data D10 based on a rule file D30. The rule file D30 may refer to an LVS rule file (or an LVS rule deck) that defines a device by using a plurality of layers in the layout of the IC. For example, the rule file D30 may include a series of codes written according to a Standard Verification Rule Format (SVRF) or a TCL Verification Format (TVF).

According to an exemplary embodiment of the present inventive concept, the rule file D30 may include a DRC syntax DS, and the DRC verifier 31 may automatically detect connectivity between the polygons by performing DRC on the layout data D10 according to the DRC syntax DS included in the rule file D30. At this time, the DRC result data D40 may include the detected connectivity. Although the DRC verifier 31 is included in the LVS engine 30 described with reference to FIG. 3, exemplary embodiments of the present inventive concept are not limited thereto. According to an exemplary embodiment of the present inventive concept, the DRC verifier 31 might not be included in the LVS engine 30, and may be implemented using a separate DRC engine. An operation of the DRC verifier 31 will be described in more detail below with reference to FIG. 5.

Figure 5:
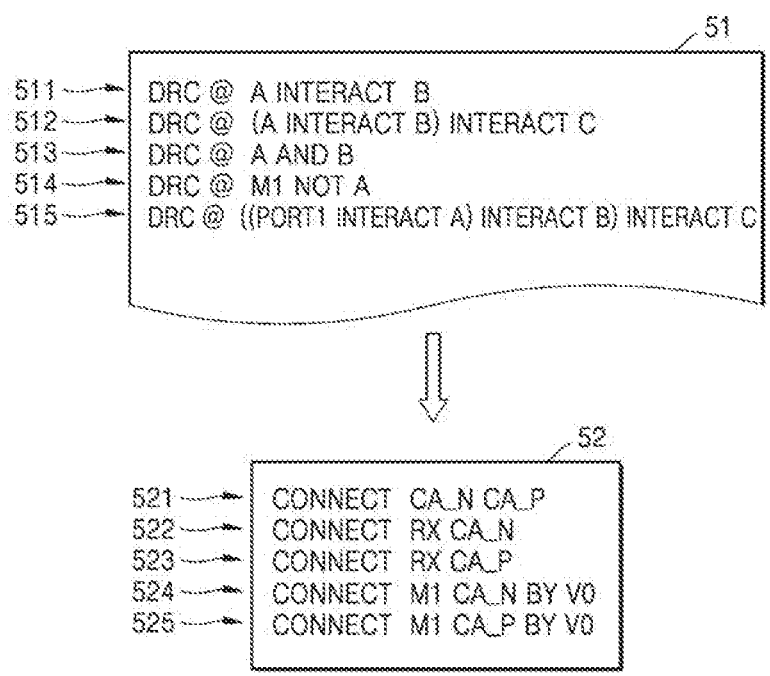
FIG. 5 illustrates a rule file and connectivity, according to an exemplary embodiment of the present inventive concept.

FIG. 5 illustrates a rule file and connectivity according to an exemplary embodiment of the present inventive concept.

Referring to FIGS. 3, 4A, 4B and 5, a rule file 51 may include first through fifth DRC syntaxes 511, 512, 513, 514 and 515. However, exemplary embodiments of the present inventive concept are not limited thereto, and the rule file 51 may include at least one of the first through fifth DRC syntaxes 511 through 515, or may further include DRC syntaxes other than the first through fifth DRC syntaxes 511 through 515. According to an exemplary embodiment of the present inventive concept, the first through fifth DRC syntaxes 511 through 515 may be DRC loop syntaxes implemented by a loop algorithm, and accordingly, may instruct DRCs to be performed on the plurality of layers included in the layout data D10 and the plurality of polygons included in each layer. The first through fifth DRC syntaxes 511 through 515 will be described in more detail below.

The first DRC syntax 511 may be configured to check whether two polygons touch each other, in order to detect lateral connectivity or vertical connectivity between the polygons in the layout data D10. For example, the first DRC syntax 511 may be generated as " . . . {@ A INTERACT B}" or " . . . {@ A TOUCH B}". Herein, A may indicate a first polygon and B may indicate a second polygon. According to an exemplary embodiment of the present inventive concept, the layout data D10 may include the active area RX and the first contact CA_N respectively arranged on different layers, and the first DRC syntax 511 may instruct a check as to whether the active area RX and the first contact CAN touch each other (for example, " . . . {@RX INTERACT CA_N}"). According to an exemplary embodiment of the present inventive concept, the layout data D10 may include the first and second contacts CAN and CA_P included in the same layer, and the first DRC syntax 511 may instruct a check as to whether the first and second contacts CAN and CA_P touch each other (for example, " . . . {@ CA_N INTERACT CA_P}").

The second DRC syntax 512 may be configured to check whether at least three polygons touch one another, in order to detect vertical connectivity between the polygons in the layout data D10. For example, the second DRC syntax 512 may be generated as " . . . {@ (A INTERACT B) INTERACT C}" or " . . . {@ (A TOUCH B) TOUCH C}". Herein, A, B, and C may respectively represent first through third polygons arranged on different layers. According to an exemplary embodiment of the present inventive concept, the layout data D10 may include the first contact CA_N, the via V0, and the first metal layer M1 respectively arranged on different layers, and the second DRC syntax 512 may instruct a check as to whether the first contact CA_N, the via V0, and the first metal layer M touch one another (for example, " . . . {@ (M1 INTERACT CA_N) INTERACT V0)}").

The third DRC syntax 513 may be configured to check whether the polygons in the layout data D10 overlap each other. For example, the third DRC syntax 513 may be generated as " . . . {@ A AND B}". Herein, A and B may respectively represent first and second polygons arranged on the same layer. According to an exemplary embodiment of the present inventive concept, the layout data D10 may include a first layer, and the third DRC syntax 513 may instruct a check as to whether the first and second polygons A and B included in the first layer overlap each other. The third syntax 513 will be described in more detail below with reference to FIG. 18.

The fourth DRC syntax 514 may be configured to check a polygon not defined as a derived layer, namely, a missing polygon, in the layout data D10. For example, the fourth DRC syntax 514 may be generated as " . . . {@ M1 NOT A}". Herein, M1 may represent an original layer, and A may represent a polygon derived from the original layer, namely, a derived layer. According to an exemplary embodiment of the present inventive concept, the layout data D10 may include a first layer divided into at least one polygon, and the fourth DRC syntax 514 may instruct a check as to whether a polygon not defined as the at least one polygon exists on the first layer. The fourth DRC syntax 514 will be described in more detail below with reference to FIG. 19.

The fifth DRC syntax 515 may be configured to check a floating net in the layout data D10. For example, the fifth DRC syntax 515 may be generated as " . . . {@(((PORT1 INTERACT A) INTERACT B) INTERACT C}". Herein, PORT1 may represent a polygon corresponding to a specific port, and A, B, and C may respectively represent first through third polygons arranged on different layers. The fifth DRC syntax 515 will be described in more detail below with reference to FIGS. 20A and 20B.

Thus, connectivity missing, connectivity overlapping, or connectivity floating may be detected using various DRC syntaxes, such as the first through fifth DRC syntaxes 511 through 515. According to an exemplary embodiment of the present inventive concept, various DRC syntaxes, such as the first through fifth DRC syntaxes 511 through 515, may be implemented via a loop method of coding in order to detect all connectivities included in layout data during a DRC operation.

The DRC verifier 31 may generate DRC result data D40 by automatically detecting first through fifth connectivities 521, 522, 523, 524 and 525 from the layout data D10 based on the rule file 51. According to an exemplary embodiment of the present inventive concept, the DRC verifier 31 may detect the first connectivity 521 between the first contact CA_N and the second contact CA_P, the second connectivity 522 between the active area RX and the first contact CA_N, and the third connectivity 523 between the active area RX and the second contact CA_P by performing a DRC on the layout data D10 according to the first DRS syntax 511 included in the rule file 51.

According to an exemplary embodiment of the present inventive concept, the DRC verifier 31 may detect the fourth connectivity 524 between the first metal layer M1, the first contact CA_N, and the via V0 and the fifth connectivity 525 between the first metal layer M1, the second contact CA_P, and the via V0 by performing a DRC on the layout data D10 according to the second DRS syntax 512 included in the rule file 51. Thus, connectivity information included in the DRC result data 52 may include the first through fifth connectivities 521 through 525, which are connectivities of actually-connected polygons in the layout data D10.

According to an exemplary embodiment of the present inventive concept, because the DRC verifier 31 performs a DRC on the layout data D10 according to a DRC syntax, when connectivity corresponding to the DRC syntax is not detected from the layout data D10, no more detection is performed, and the DRC syntax may be ignored. For example, in the case of the DRC syntax " . . . {@ A AND B}", the DRC verifier 31 may perform no more detections when there is no overlaps between the polygons A and B in the layout data D10. Thus, even when the number of DRC syntaxes is relatively large, an LVS runtime might not increase. According to an exemplary embodiment of the present inventive concept, because the DRC verifier 31 performs a DRC on the layout data D10 according to a DRC loop syntax, an operation manually described and checked by a person may be omitted, and thus an IC developing time period may be reduced, and a missing polygon not defined as a derived layer may be detected.

Referring back to FIG. 3, the LVS verifier 32 may generate LVS result data D50 by performing an LVS verification of comparing the layout data D10 with the schematic data D20 based on the rule file D30 and the DRC result data D40. For example, the LVS verifier 32 may extract a layout netlist from the layout data D10, based on the rule file D30 and the DRC result data D40. The LVS verifier 32 may generate a source netlist by compiling the schematic data D20. Then, the LVS verifier 32 may generate the LVS result data D50 by comparing the layout netlist with the source netlist. Thus, the LVS result data D50 may include information about whether the layout data D10 and the schematic data D20 are identical and may also include information about a discrepancy between the layout data D10 and the schematic data D20. A designer may correct the layout data D10 or the schematic data D20 by referring to the LVS result data D50.

Figure 6:
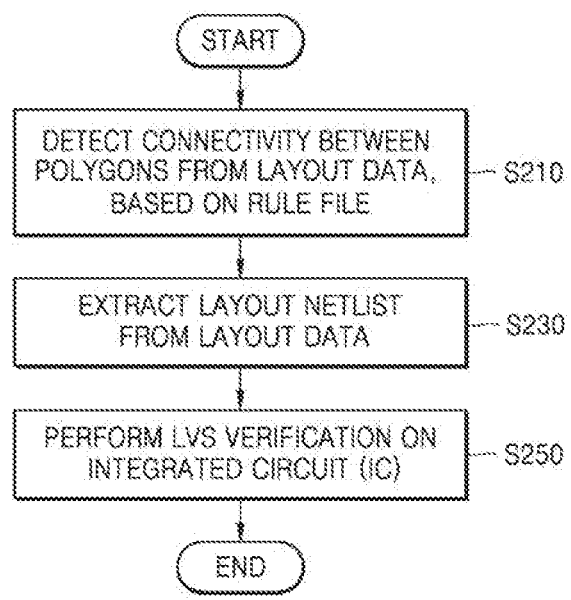
FIG. 6 is a flowchart of a method of performing an LVS verification on an IC, according to an exemplary embodiment of the present inventive concept.

FIG. 6 is a flowchart of a method of performing an LVS verification on an IC, according to an exemplary embodiment of the present inventive concept.

Referring to FIG. 6, the LVS verification method according to an exemplary embodiment of the present inventive concept may correspond to an embodiment of operation S150 (see, e.g. FIG. 1). Accordingly, descriptions made above with reference to FIGS. 1-3, 4A, 4B and 5 may be equally applied to the exemplary embodiment of the present inventive concept described in more detail below, and duplicative descriptions may be omitted below. The LVS verification method (e.g., operation S150) may include operations S210, S230, and S250, and operations S210, S230 and S250, which may be performed by a processor (for example, the processor 110 described above with reference to FIG. 2). Thus, an exemplary algorithm for performing operation S150 (see, e.g., FIG. 1), including the steps of performing a layout-versus-schematic (LVS) verification on the IC, thus generating LVS result data, which may be executed by the computing system 110 described with reference to FIG. 2 (see, e.g., synthesis module 130c) will be described in more detail below with reference to FIGS. 6, 7A and 7B.

In operation S210, connectivity between polygons is detected from layout data, based on a rule file including a DRC syntax. According to an exemplary embodiment of the present inventive concept, the rule file may further include definitions of a plurality of layers included in the layout data, and definitions of a plurality of polygons included in each of the plurality of layers. According to an exemplary embodiment of the present inventive concept, the DRC syntax may be a DRC loop syntax implemented using a loop algorithm. According to the DRC loop syntax, connectivity may be detected for each of the plurality of layers included in the layout data and for each of the plurality of polygons included in each of the plurality of layers. For example, the DRC syntax may be implemented using 'foreach loop'.

In operation S230, a layout netlist is extracted from the layout data by using the connectivity. In operation S250, the LVS verification on the IC is performed so that LVS result data is generated by comparing schematic data of the IC with the layout netlist. According to an exemplary embodiment of the present inventive concept, the LVS verification method may further include an operation of compiling a source netlist from the schematic data, and the LVS verification may be performed by comparing the source netlist with the layout netlist. For example, in the LVS verification operation, double counting, or a short/open check may be performed on the connectivity between the polygons and a parasitic component by using the loop algorithm.

Figure 7A:
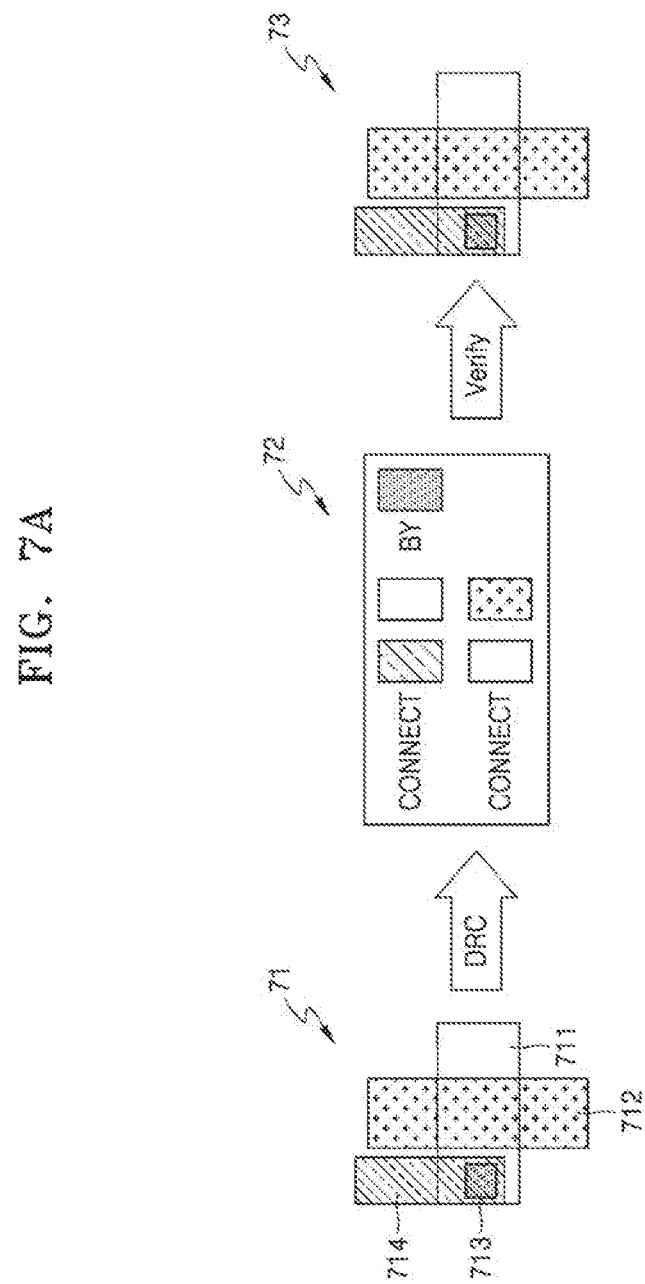
FIG. 7A illustrates an LVS operation according to an exemplary embodiment of the present inventive concept.
Figure 7B:
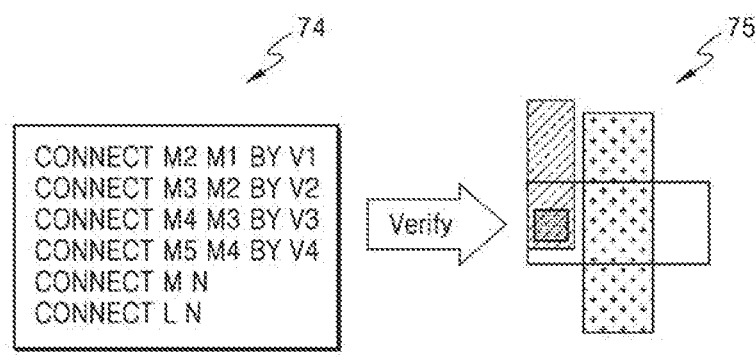
FIG. 7B illustrates an LVS operation according to a comparative example.

FIG. 7A illustrates an LVS operation according to an exemplary embodiment of the present inventive concept. FIG. 7B illustrates an LVS operation according to a comparative example.

Referring to FIG. 7A, according to an exemplary embodiment of the present inventive concept, connectivity 72 between polygons may be automatically detected by performing DRC on layout data 71, based on a rule file, and LVS verification-completed layout data 73 may be obtained by performing LVS verification using the detected connectivity 72. The layout data 71 may include first through fourth polygons 711, 712, 713 and 714. The first and fourth polygons 711 and 714 may be perpendicularly connected to each other via the third polygon 713, and the first and second polygons 711 and 712 may be perpendicularly connected to each other.

Accordingly, the connectivity 72 may include two connectivities for actually connected polygons in the layout data 71.

Referring to FIG. 7B, in the conventional art, before layout data is generated, a person, namely, a designer, describes connectivity 74 as a text. For example, the connectivity 74 is described using a function 'CONNECT' or a function 'push_conn_stack'. For example, the connectivity 74 may be described as 'CONNECT A B BY V1', where 'CONNECT' is a function and A, B, and V1 are factors. As the number of factors in an IC increases by miniaturization of an IC, a combination of the factors exponentially increases. Thus, errors may be continuously generated.

In the IC, a net connection may be established by wires, and the wires may include metal layers and vias. During LVS verification, if a net connection is not accurately detected, shorting and opening of a net might not be distinguished from each other in a real mask. However, in the existing art, a person performs this decision via typing. Due to the miniaturization of a process, a physical relationship between wires cannot be distinguished by the eyes of a person, and thus a Computer Aided Engineering (CAE)-level solution may be utilized. According to an exemplary embodiment of the present inventive concept, in a DRC verification operation, the connectivity 72 between the polygons is automatically detected from the layout data 71, and the detected connectivity 72 is applied to the LVS verification operation, thus reducing or eliminating errors. Accordingly, a mask failure due to an error in the LVS verification may be prevented.

Figure 8:
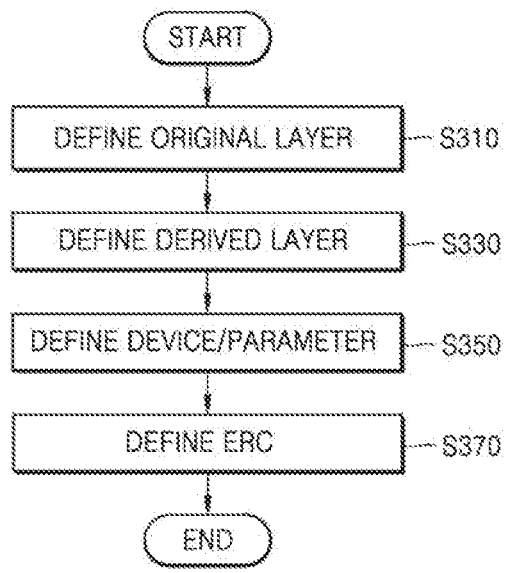
FIG. 8 is a flowchart of an LVS coding method according to an exemplary embodiment of the present inventive concept.

FIG. 8 is a flowchart of an LVS coding method according to an exemplary embodiment of the present inventive concept.

Referring to FIG. 8, the LVS coding method according to an exemplary embodiment of the present inventive concept may correspond to a method of generating a rule file that is used in LVS verification. For example, the LVS coding method may be included in operation S150 (see, e.g., FIG. 1) or may be performed before operation S210 (see, e.g., FIG. 6).

In operation S310, an original layer is defined. In operation S330, a derived layer is defined. The original layer may be classified into a plurality of derived layers, and the plurality of derived layers may correspond to a plurality of polygons. According to an exemplary embodiment of the present inventive concept, the original layer may be classified into a plurality of derived layers according to a process base including the concentration of impurities or the thickness of a metal layer. According to an exemplary embodiment of the present inventive concept, the original layer may be classified into a plurality of derived layers logically via coding. However, exemplary embodiments of the present inventive concept are not limited thereto, and the original layer may be classified into a plurality of derived layers according to various standards.

In operation S350, a device and a parameter are defined. For example, the device may include a PMOS, or an NMOS. The parameter may be a geometric parameter associated with electrical characteristics of the device, and may include, for example, a width and a length of the device. According to an exemplary embodiment of the present inventive concept, the LVS coding method may further include, after operation S350, an operation of defining objects for comparison between layout data and schematic data in the LVS verification operation. In operation S370, an electrical rule check (ERC) is defined.

In the conventional art, an operation of defining connectivity is performed between operations S330 and S350 in a conventional LVS coding process, and a designer directly describes connectivity before layout data of an IC is generated. However, according to an exemplary embodiment of the present inventive concept, the operation in which a designer defines connectivity may be omitted from the LVS coding method, and thus, connectivity between polygons may be omitted from a rule file (for example, the rule file 51 described with reference to FIG. 5). Accordingly, rule files according to an exemplary embodiment of the present inventive concept may omit coding associated with connectivity, and may not include, for example, a function 'CONNECT' or 'push_conn_stack'.

Figure 9:
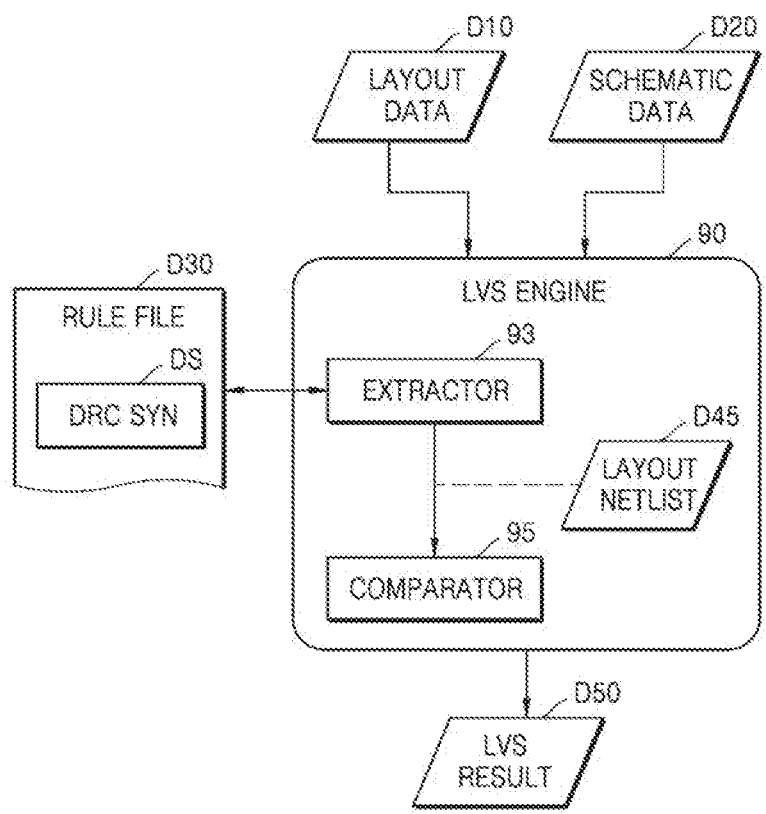
FIG. 9 is a block diagram of an LVS engine according to an exemplary embodiment of the present inventive concept.

FIG. 9 is a block diagram of an LVS engine according to an exemplary embodiment of the present inventive concept.

Referring to FIG. 9, an LVS engine 90 may include an extractor 93 and a comparator 95. The extractor 93 may extract connectivity between polygons from the layout data D10 based on the rule file D30, and may extract a layout netlist D45 from the layout data D10 based on the extracted connectivity and the rule file D30. According to an exemplary embodiment of the present inventive concept, the extractor 93 may be configured to include a DRC procedure configured to perform a DRC on the layout data D10 according to the DRC syntax DS included in the rule file D30.

The comparator 95 may compare the layout netlist D45 with the schematic data D20, and, for example, may compare parameters, such as a connection state of a net, the number of devices, the widths and lengths of the devices. When the layout netlist D45 and the schematic data D20 are identical to each other, the comparator 95 may generate LVS result data D50 including a pass result. On the other hand, when the layout netlist D45 and the schematic data D20 are not identical to each other, the comparator 95 may generate LVS result data D50 including a fail result. According to an exemplary embodiment of the present inventive concept, the LVS engine 90 may further include a compiler for generating a source netlist from the schematic data D20.

Figure 10:
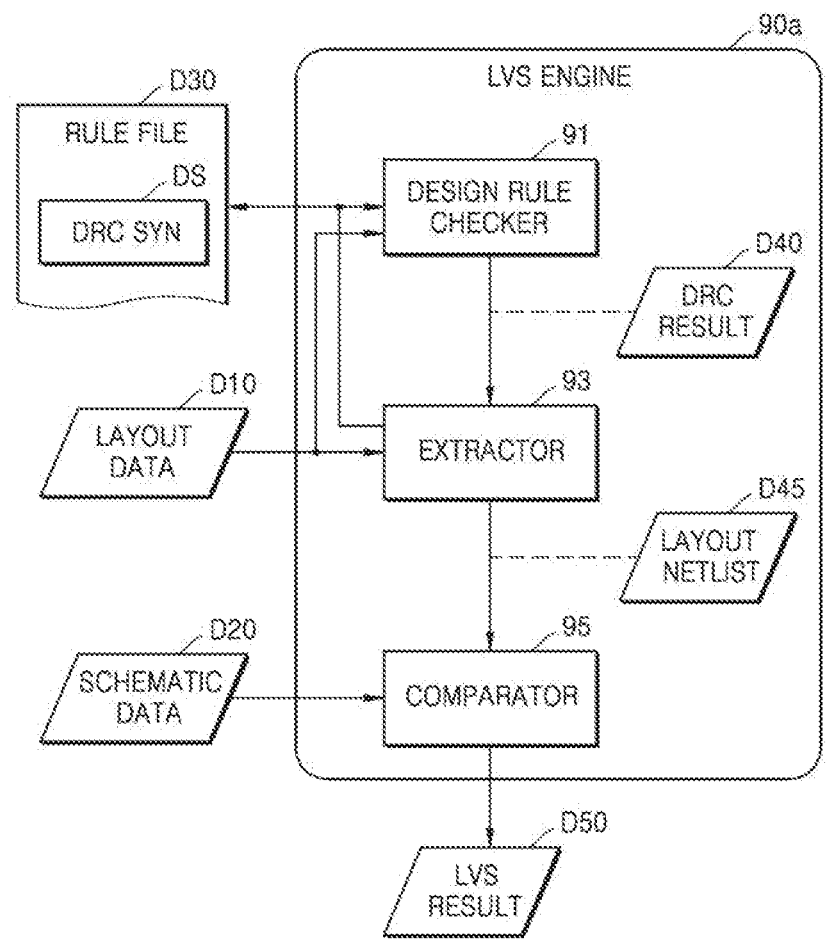
FIG. 10 is a block diagram of an LVS engine according to an exemplary embodiment of the present inventive concept.

FIG. 10 is a block diagram of an LVS engine according to an exemplary embodiment of the present inventive concept.

Referring to FIG. 10, the LVS engine 90a may include a design rule checker 91, an extractor 93, and a comparator 95, and may correspond to a modification of the LVS engine 90 described with reference to FIG. 9. The design rule checker 91 may automatically extract connectivity between polygons and generate the DRC result data D40 including the extracted connectivity, by performing a DRC on the layout data D10 according to the DRC syntax DS included in the rule file 30. The extractor 93 may extract the layout netlist D45 from the layout data D10, based on the extracted connectivity and the rule file D30. The comparator 95 may generate the LVS result data D50 by comparing the layout netlist D45 with the schematic data D20.

Figure 11A:
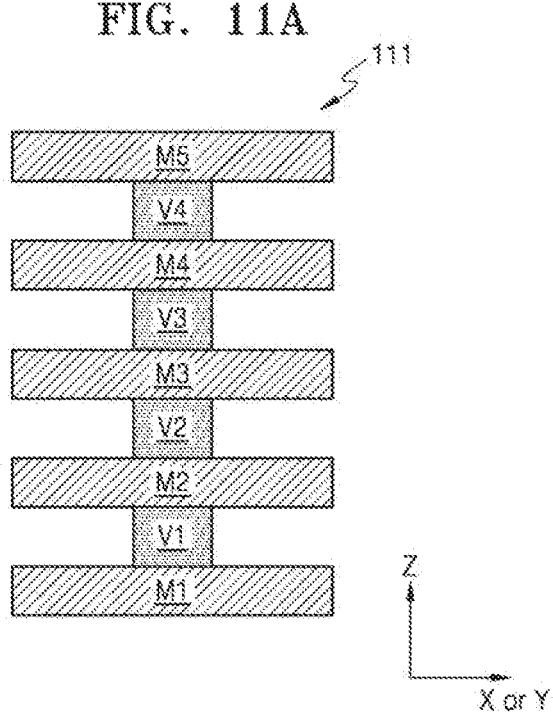
FIG. 11A illustrates an example of a layout structure included in a layout of an IC, according to an exemplary embodiment of the present inventive concept.
Figure 11B:
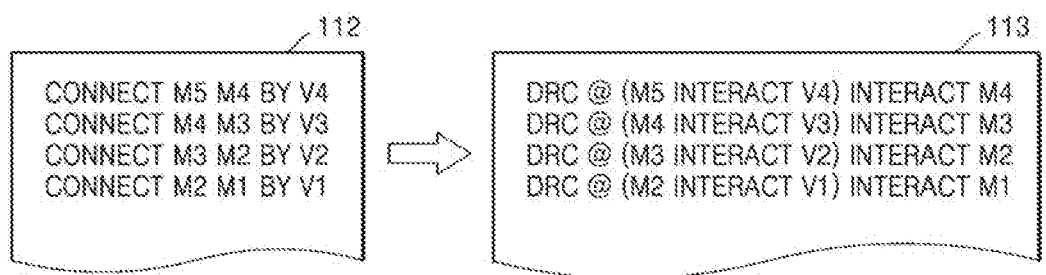
FIG. 11B illustrates a rule file according to an exemplary embodiment of the present inventive concept.

FIG. 11A illustrate an example of a layout structure included in the layout of an IC, according to an exemplary embodiment of the present inventive concept. FIG. 11B illustrates a rule file according to an exemplary embodiment of the present inventive concept.

Referring to FIG. 11A, the layout structure 111 may include a plurality of metal layers M1, M2, M3, M4 and M5 and a plurality of vias V1, V2, V3 and V4 stacked vertically. The vias V1 through V4 may electrically connect adjacent metal layers of the metal layers M1 through M5 to each other. For example, the first via V1 may be disposed between the first metal layer M and the second metal layer M2 and electrically connect the first metal layer M1 to the second metal layer M2.

Referring to FIG. 11B, a conventional rule file 112 may include four lines of 'CONNECT' syntaxes corresponding to connectivity of the layout structure Ill, in which the 'CONNECT' syntaxes were described by a designer. Even when these simple 'CONNECT' syntaxes are described, typographical errors and omissions may be generated during a text typing process. However, the rule file 113 according to an exemplary embodiment of the present inventive concept may include DRC syntaxes, and the DRC syntaxes may instruct connectivity between all layers and all polygons included in the layout structure 111 to be automatically detected using a loop algorithm.

Figure 12A:
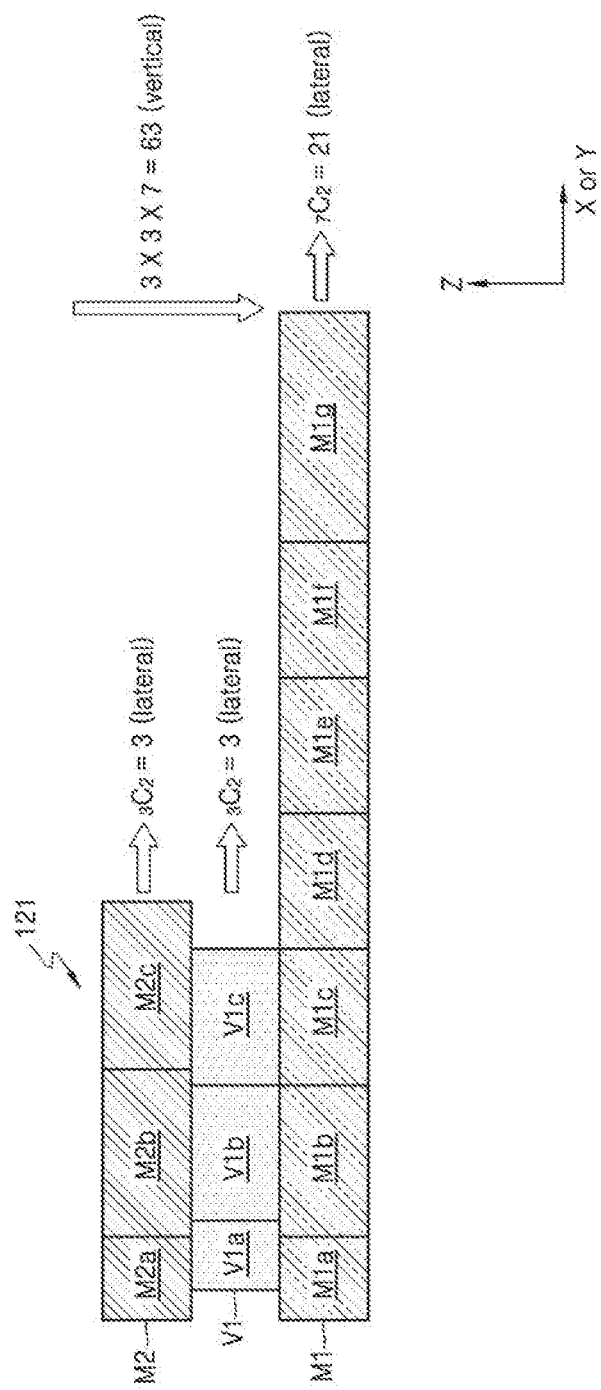
FIG. 12A illustrates an example of a layout structure included in a layout of an IC, according to an exemplary embodiment of the present inventive concept.

FIG. 12A illustrates an example of a layout structure included in a layout of an IC according to an exemplary embodiment of the present inventive concept. FIG. 12B illustrates a rule file according to an exemplary embodiment of the present inventive concept.

Referring to FIG. 12A, a layout structure 112 may include a first metal layer M1, a first via layer V1, and a second metal layer M2 stacked in a vertical direction (for example, a Z direction). The first metal layer M1, the first via layer V1, and the second metal layer M2 may respectively correspond to original layers defined in operation S310 (see, e.g., FIG. 8). Each of the first metal layer M1, the first via layer V1, and the second metal layer M2 may be classified into a plurality of derived layers in a horizontal direction (e.g., an X or Y direction).

For example, the first metal layer M1 may be classified into 7 derived layers respectively corresponding to 7 polygons M1a, M1b, M1c, M1d, M1e, M1f and M1g, and the number of lateral connectivities possible in the first metal layer M1 may be 21 (i.e., 7C2). For example, the first via layer V1 may be classified into 3 derived layers respectively corresponding to 3 polygons V1a through V1c, and the number of lateral connectivities possible in the first via layer V may be 3 (i.e., 3C2). For example, the second metal layer M2 may be classified into 3 derived layers respectively corresponding to 3 polygons M2a through M2c, and the number of lateral connectivities possible in the second metal layer M2 may be 3 (i.e., 3C2). The number of vertical connectivities possible in the first metal layer M1, the first via layer V1, and the second metal layer M2 may be 63 (i.e., 3*3*7).

Referring to FIG. 12B, a conventional rule file 122 may include 90 lines of 'CONNECT' syntaxes corresponding to connectivity of the layout structure 121, in which the 'CONNECT' syntaxes were described by a designer. For example, the conventional rule file 122 may include three lines of syntaxes 122a describing the lateral connectivities of the second metal layer M2, three lines of syntaxes 122b describing the lateral connectivities of the first via layer V1, 21 lines of syntaxes 122c describing the lateral connectivities of the first metal layer M1, and 63 lines of syntaxes 122d describing the vertical connectivities of the first metal layer M1, the first via layer V1, and the second metal layer M2.

The rule file 123 according to an exemplary embodiment of the present inventive concept may include a first portion 123a defining original layers and derived layers, and a second portion 123b defining DRC syntaxes. The first portion 123a may define the first metal layer M1, the first via layer V1, and the second metal layer M2 as the original layers, defines the derived layers of the first metal layer M1 as the polygons M1a through M1g, define the derived layers of the first via layer V1 as the polygons V1a through V1c, and define the derived layers of the second metal layer M2 as the polygons M2a through M2c.

In the second portion 123b, the DRC syntaxes may instruct connectivity between all layers and all polygons included in the layout structure 121 to be automatically detected using a loop algorithm. For example, the DRC syntaxes may include foreach Tcl (Tool Command Language), and thus, may instruct DRC to be performed on the derived layers included in each original layer. Accordingly, even when the number of polygons included in layout data sharply increases due to the miniaturization of an IC, connectivities between the polygons may be all detected.

FIG. 13 illustrates an example of a rule file according to an exemplary embodiment of the present inventive concept.

Referring to FIG. 13, the rule file 131 may include a first portion 131a defining original layers and derived layers, and a second portion 132b defining DRC syntaxes. The first portion 131a may correspond to an example of the first portion 123a (see, e.g., FIG. 12B), and the second portion 131b may correspond to an example of the second portion 123b (see, e.g., FIG. 12B). A DRC syntax included in the second portion 131b may be implemented using a foreach loop, and accordingly, connectivities between all layers included in layout data and all derived layers included in each layer, namely, polygons, may be automatically detected.

Figure 14:
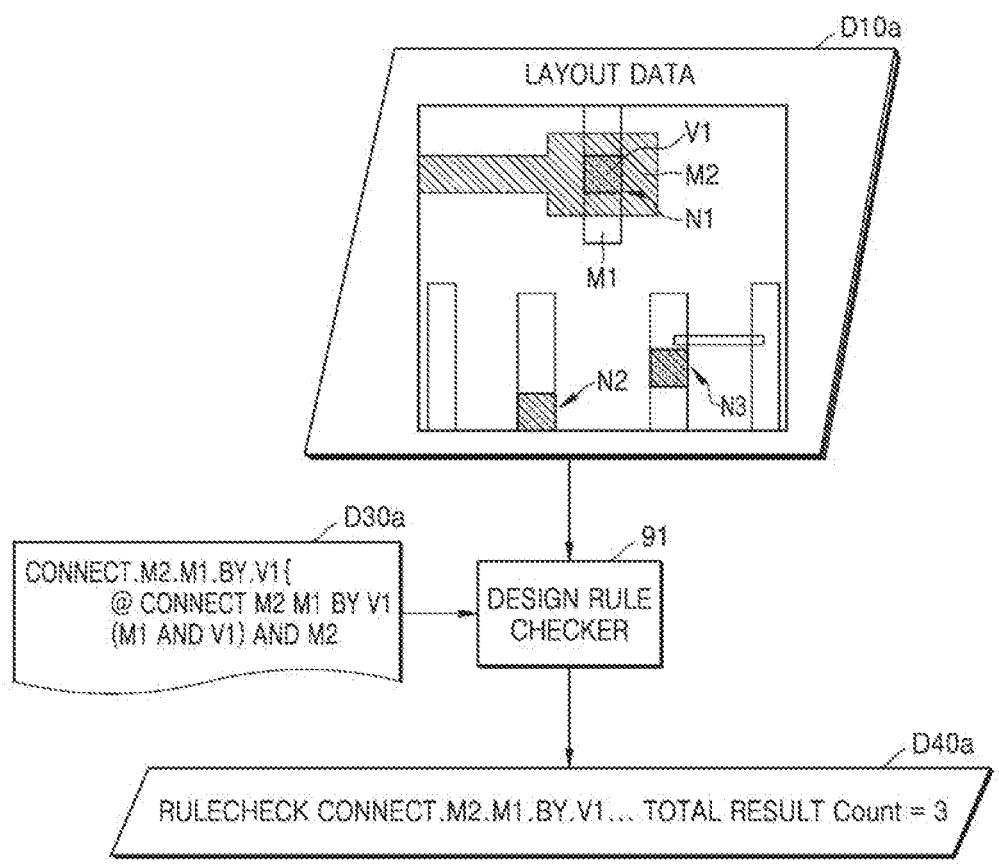
FIG. 14 illustrates an example of a design rule check (DRC) operation according to an exemplary embodiment of the present inventive concept.

FIG. 14 illustrates an example of a DRC operation according to an exemplary embodiment of the present inventive concept.

Referring to FIG. 14, layout data D10a may include first and second metal layers M1 and M2, and a first via V1 between the first and second metal layers M1 and M2. The design rule checker 91 may generate DRC result data D40a by performing DRC on the layout data D10a according to a DRC syntax included in a rule file D30a. The rule file D30a may include a DRC syntax expressed as, for example, " . . . @ (M1 AND V1) AND M2", and accordingly, the design rule checker 91 may automatically detect connectivity between the first and second metal layers M1 and M2 and the first via V1 from the layout data D10a.

The layout data D10a may include first through third nets N1, N2 and N3. Each of the first through third nets N1 through N3 may correspond to vertical connectivity between the first and second metal layers M1 and M2 and the first via V1. Accordingly, the DRC result data D40a may include information indicating that the total number of connectivities between the first and second metal layers M1 and M2 and the first via V1 detected from the layout data D10a is 3. The DRC result data D40a may be referred to as a DRC log file.

Figure 15:
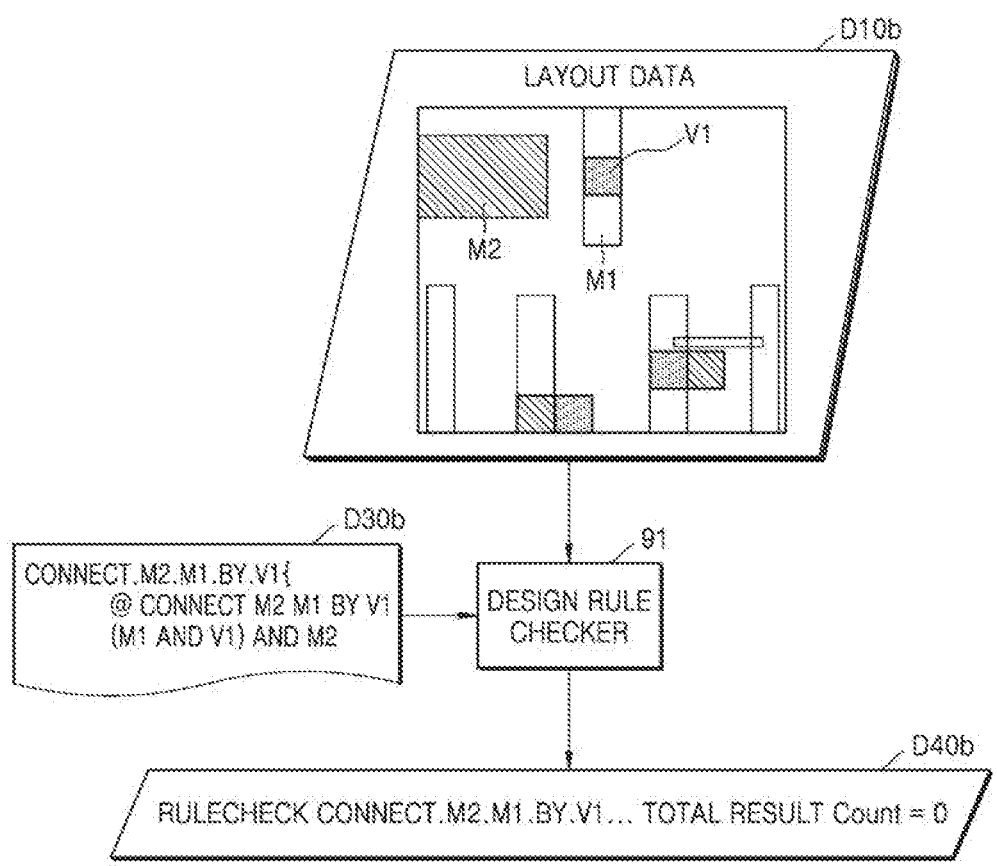
FIG. 15 illustrates an example of a DRC operation according to an exemplary embodiment of the present inventive concept.

FIG. 15 illustrates an example of a DRC operation according to an exemplary embodiment of the present inventive concept.

Referring to FIG. 15, layout data D10b may include first and second metal layers M1 and M2, and a first via V1 between the first and second metal layers M1 and M2. The design rule checker 91 may generate DRC result data D40b by performing DRC on the layout data D10b according to a DRC syntax included in a rule file D30b. The rule file D30b may include a DRC syntax expressed as, for example, " . . . {@ (M1 AND V1) AND M2}", and accordingly, the design rule checker 91 may automatically detect connectivity between the first and second metal layers M1 and M2 from the layout data D10b.

The layout data D10b may include no vertical connectivity between the first and second metal layers M1 and M2 and the first via V1. Accordingly, the DRC result data D40b may include information indicating that the total number of detected connectivities between the first and second metal layers M1 and M2 and the first via V is 0.

FIGS. 16-19, 20A, 20B and 21 illustrate examples of a connectivity detecting operation due to a DRC, according to exemplary embodiments of the present inventive concept.

Figure 16:
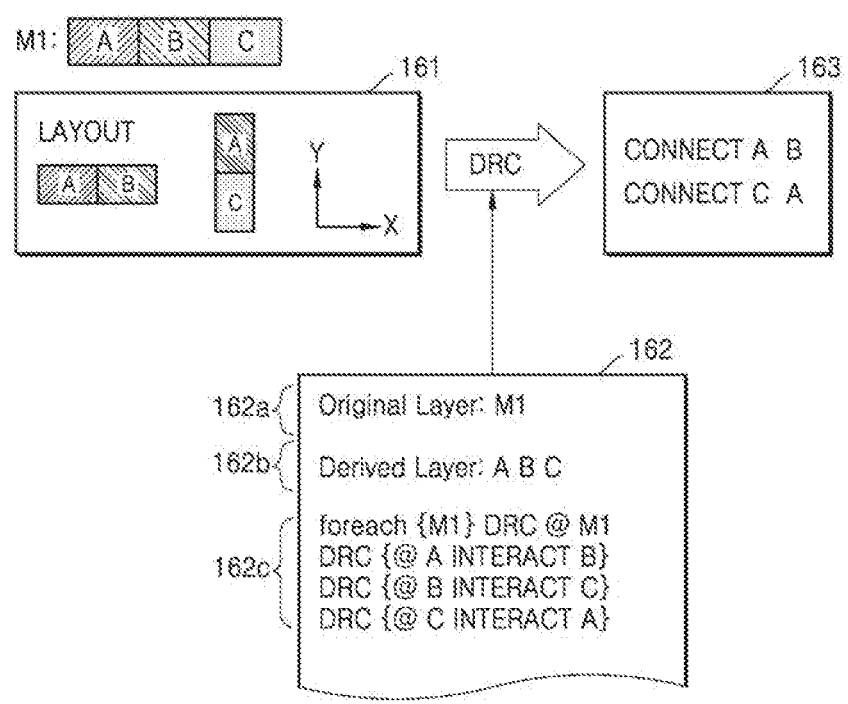
FIGS. 16-19, 20A, 20B and 21 illustrate examples of a connectivity detecting operation due to a DRC, according to exemplary embodiments of the present inventive concept.

Referring to FIG. 16, an original layer is the first metal layer M1, and the first metal layer M1 may be classified into first through third derived layers, for example, first through third polygons A, B, and C. According to layout data 161, the first and second polygons A and B may be connected to each other in a first direction (for example, an X direction), and the first and third polygons A and C may be connected to each other in a second direction (for example, a Y direction).

According to an exemplary embodiment of the present inventive concept, a rule file 162 may include a first portion 162a defining the original layer, a second portion 162b defining the derived layers, and a third portion 162c including DRC syntaxes. The third portion 162c implements the DRC syntaxes as a loop algorithm by using a foreach loop. Accordingly, according to the DRC syntaxes included in the rule file 162, DRC may be performed on each of the derived layers A through C included in the first metal layer M1. DRC result data 163 may include only "CONNECT A B" and "CONNECT C A", which are connectivities of actually-connected polygons in the layout data 161.

Figure 17:
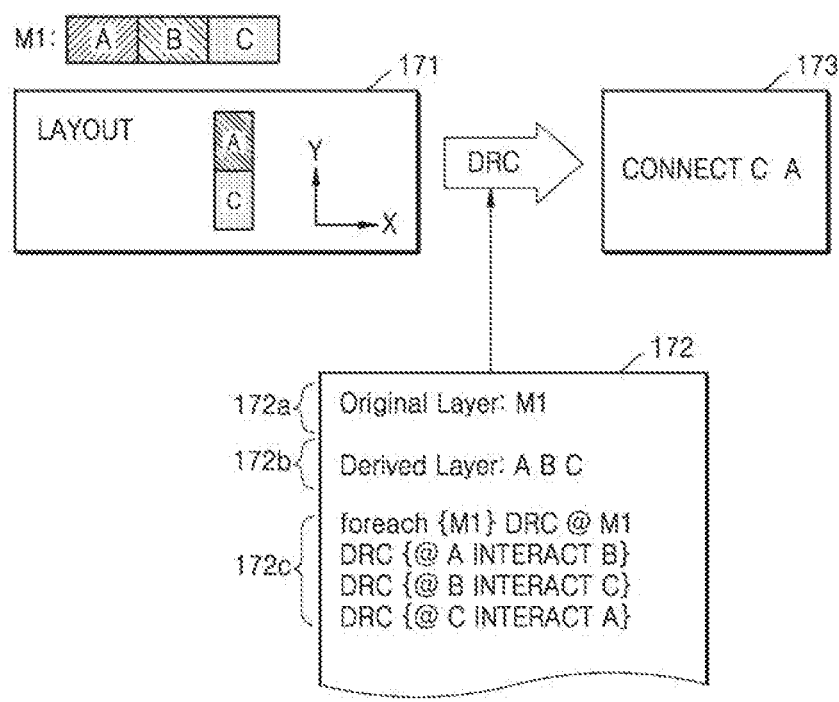

Referring to FIG. 17, an original layer is the first metal layer M1, and the first metal layer M1 may be classified into first through third derived layers, for example, first through third polygons A, B, and C. According to layout data 171, the first and third polygons A and C may be connected to each other in a second direction (for example, a Y direction).

According to an exemplary embodiment of the present inventive concept, a rule file 172 may be substantially the same as the rule file 162 described with reference to FIG. 16. Accordingly, according to the DRC syntaxes included in the rule file 172, DRC may be performed on each of the derived layers A through C included in the first metal layer M1. DRC result data 173 may include only "CONNECT C A", which is connectivity between actually-connected polygons in the layout data 171.

Figure 18:
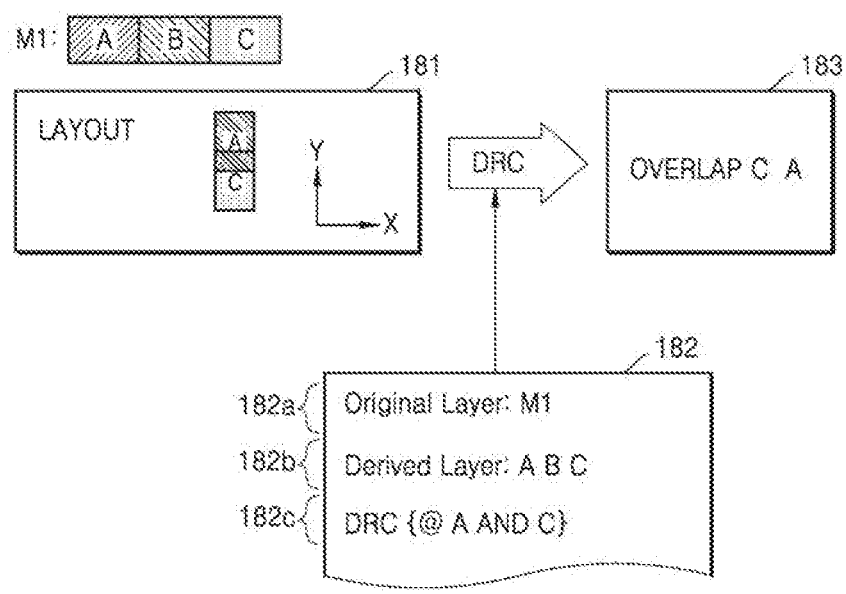

Referring to FIG. 18, an original layer is the first metal layer M1, and the first metal layer M1 may be classified into first through third derived layers, for example, first through third polygons A, B, and C. According to layout data 181, the first and third polygons A and C may overlap each other in a second direction (for example, a Y direction). Thus, when the first and third polygons A and C overlap each other, a parasitic component, such as a parasitic resistance or parasitic capacitance, may be repeatedly extracted from an overlapping area therebetween in a parasitic component extraction operation (for example, operation S170 described with reference to FIG. 1). Accordingly, an error may be generated in parasitic component data, and consequently an error may also be generated in a timing analysis result of an IC. Therefore, an overlapping area needs to be detected from lateral connectivity. However, according to the conventional art, because connectivity is described before a layout is generated, an overlap area might not be predicted, and thus it is difficult to detect the overlap area.

According to an exemplary embodiment of the present inventive concept, a rule file 182 may include a first portion 182a defining the original layer, a second portion 182b defining the derived layers, and a third portion 182c including a DRC syntax. For example, the third portion 182c may include a DRC syntax " . . . {@ A AND C}", and the third portion 182c may further include " . . . {@ A AND B}" and " . . . {@ B AND C}". For example, the DRC syntax in the third portion 182c may be implemented as a DRC loop syntax by using a loop algorithm. Accordingly, according to the DRC syntaxes included in the rule file 182, DRC may be performed on each of the derived layers A through C included in the first metal layer M1. DRC result data 183 may include only "OVERLAP A C", which is connectivity between actually-overlapped polygons in the layout data 181.

Figure 19:
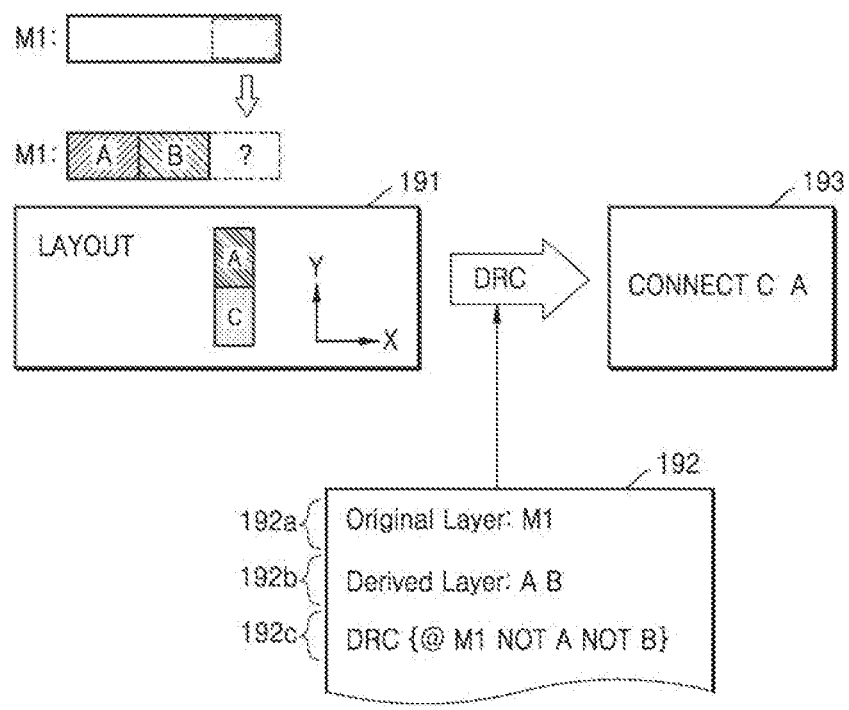

Referring to FIG. 19, an original layer is the first metal layer M1, and the first metal layer M may be classified into first and second derived layers, for example, the first and second polygons A and B. According to layout data 191, the first polygon A may be connected to a third polygon C into which the first metal layer M1 is not classified. At this time, the third polygon C included in the first metal layer M1 may be omitted during division of the first metal layer M and thus might not be defined as a derived layer in operation S330 (see, e.g., FIG. 8). According to the conventional art, because connectivity is described before a layout is generated, connectivity for the third polygon C not defined as a derived layer might not be predicted.

According to an exemplary embodiment of the present inventive concept, a rule file 192 may include a first portion 192a defining the original layer, a second portion 192b defining the derived layers, and a third portion 192c including a DRC syntax. For example, the third portion 192c may include a DRC syntax " . . . {@ M1 NOT A NOT B}". Accordingly, by performing DRC on the layout data 191 according to the DRC syntax included in the rule file 192, a polygon not defined as a derived layer may be detected from the first metal layer M1, and DRC result data 193 including "CONNECT C A", being connectivity between the actually-connected first and third polygons, may be generated.

Figure 20A:
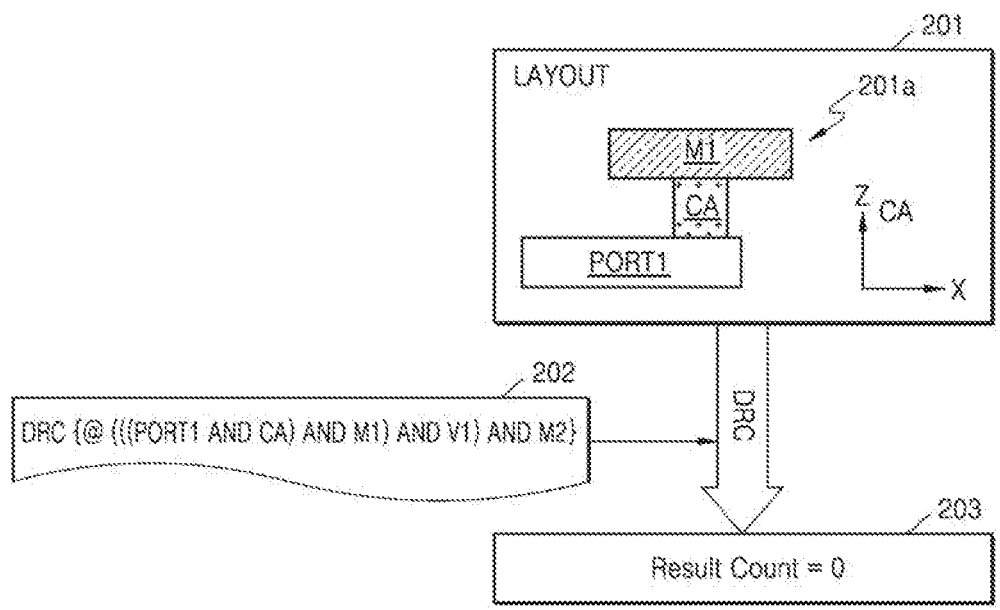

Referring to FIG. 20A, layout data 201 may include a layout structure 201a, and the layout structure 201a may include a first port PORT1, a first contact CA, and a first metal layer M1 vertically stacked. For example, when an input pin or output pin connected to the first port PORT1 is implemented using a second metal layer over the first metal layer M1, because the layout structure 201a does not include a second metal layer connected to the first port PORT1, the layout structure 201a may be a floating net.

If a rule file includes only a DRC syntax " . . . {@(a (PORT1 AND M1) AND CA}", a floating net may not be detected as a result of LVS verification on the layout data 201. However, according to an exemplary embodiment of the present inventive concept, a rule file 202 may include a DRC syntax " . . . {@ (((PORT1 AND M1) AND CA) AND V1) AND M2}" restricting a layout structure so that two or more metal layers are arranged for a specific port, for example, the first port PORT1. Accordingly, by performing DRC on the layout data 201 according to the DRC syntax included in the rule file 202, DRC result data 203 indicating that the number of nets in which two or more metal layers satisfying the DRC syntax are arranged is 0 may be generated.

Figure 20B:
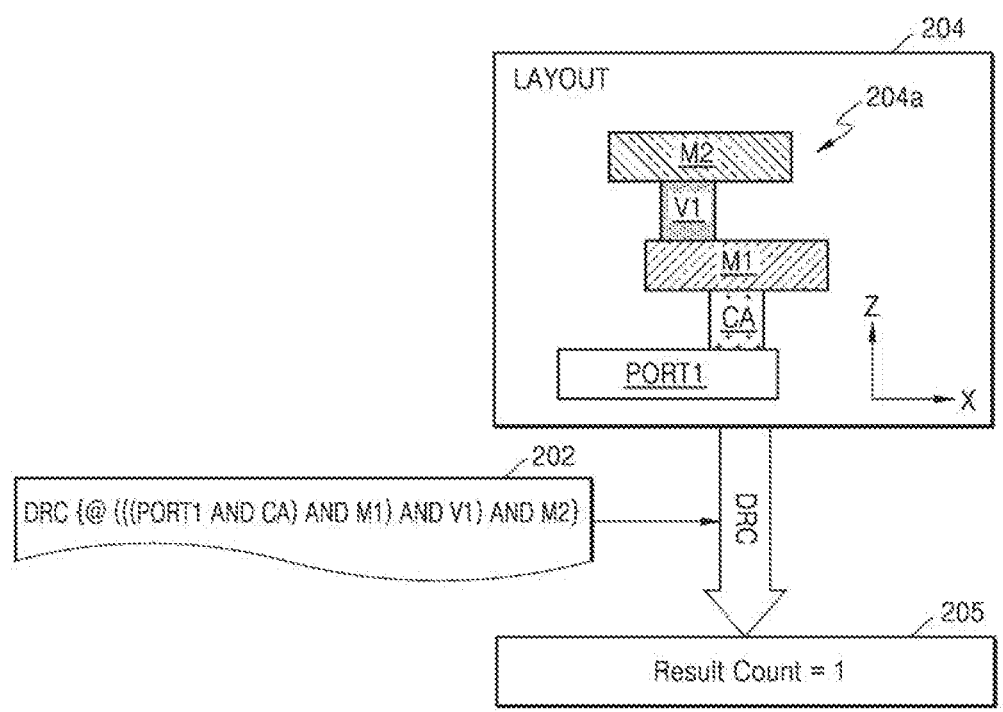

Referring to FIG. 20B, layout data 204 may include a layout structure 204a, and the layout structure 204a may include a first port PORT1, a first contact CA, a first metal layer M1, a via V1, and a second metal layer M2 vertically stacked. For example, when the second metal layer M2 is implemented using an input pin or an output pin, the layout structure 204a may be a normal net instead of a floating net. According to an exemplary embodiment of the present inventive concept, by performing DRC on the layout data 204 according to the DRC syntax included in the rule file 202, DRC result data 205 indicating that the number of nets in which two or more metal layers satisfying the DRC syntax are arranged is 1 may be generated.

Figure 21:
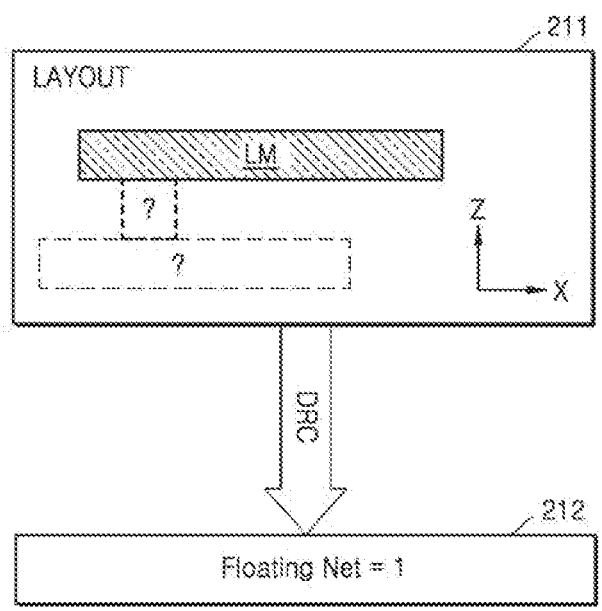

Referring to FIG. 21, layout data 211 may include a last metal layer LM, and the last metal layer LM may correspond to a pad. In the layout data 211, when no vias and lower metal layers are arranged below the last metal layer LM, the last metal layer LM may be a floating net.

In the conventional art, the last metal layer LM may be described as a pad in connectivity described before a layout is generated, and accordingly, in the LVS verification operation, the last metal layer LM was not able to be detected as a floating net. However, according to an exemplary embodiment of the present inventive concept, a rule file may include a DRC syntax (for example, " . . . {@((LM AND M1) AND V1}") restricting a layout structure such that other metal layers are connected for a specific port, such as a pad. Accordingly, by performing DRC on the layout data 211 according to the DRC syntax included in the rule file, DRC result data 212 indicating that the last metal layer is a floating net may be generated.

As described above with reference to FIGS. 1-19, 20A, 20B and 21, according to an exemplary embodiment of the present inventive concept, DRC verification is applicable to the LVS verification operation. Accordingly, the possibility of omitting connectivity information in an LVS verification operation of comparing a layout with a schematic may be reduced. As an example, according to an exemplary embodiment of the present inventive concept, errors, such as when patterns are connected to each other during LVS verification but are disconnected from each other in a real mask, when patterns are disconnected from each other during LVS verification but are connected to each other in a real mask, when no conductors exist in the LVS verification but a conductor exists in a real mask, and when a conductor exists in the LVS verification but no conductors exist in the real mask, may be all detected. According to an exemplary embodiment of the present inventive concept, an error in which an IC includes a floating net may also be detected.

Figure 22:
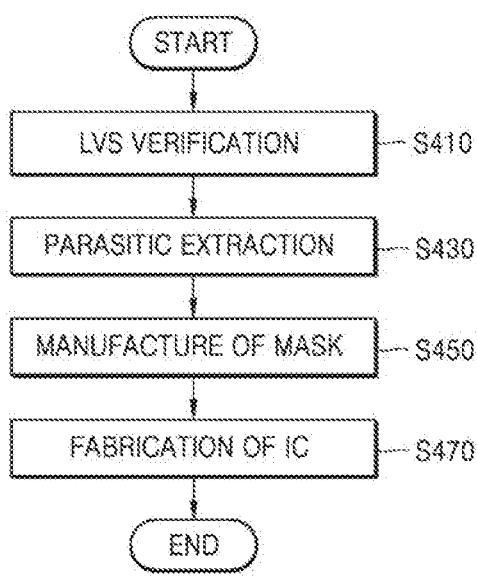
FIG. 22 is a flowchart of a method of manufacturing an IC, according to an exemplary embodiment of the present inventive concept.

FIG. 22 is a flowchart of a method of manufacturing an IC, according to an exemplary embodiment of the present inventive concept.

Referring to FIG. 22, the IC manufacturing method may be divided into a process of designing an IC and a process of manufacturing the IC. The designing of the IC may include operations S410 and S430, and the manufacturing of the IC may include operations S450 and S470. The manufacturing of the IC may include manufacturing a semiconductor device according to an IC based on layout data, and may be performed in a semiconductor process module. In the IC manufacturing method according to an exemplary embodiment of the present inventive concept, the IC may be manufactured based on layout data generated by performing the IC designing method described above with reference to FIGS. 1-3, 4A, 4B, 5, 6, 7A, 7B, 8-10, 11A, 11B, 12A, 12B, 13-15, 16-19, 20A, 20B and 21.

In operation S410, the IC undergoes LVS verification. For example, connectivity between polygons is automatically detected from layout data by performing DRC on the layout data based on a rule file including a DRC syntax, a layout netlist is extracted from the layout netlist by using the detected connectivity, and LVS verification is performed by comparing the layout netlist with schematic data. Operation S410 may correspond to operation S150 (see, e.g., FIG. 1) or operations S210 through S250 (see, e.g., FIG. 6). The descriptions above with reference to FIGS. 1 through 21 are also applicable to the exemplary embodiment of the present inventive concept described with reference to FIG. 22. In operation S430, a parasitic component extraction operation is performed on layout data for which LVS verification has been completed. Operation S430 may correspond to operation S170 (see, e.g., FIG. 1).

In operation S450, a mask is manufactured based on the layout data. According to an exemplary embodiment of the present inventive concept, the layout data may be corrected based on parasitic component data generated in operation S430, and the mask may be generated according to corrected layout data. For example, first, optical proximity correction (OPC) may be performed based on the layout data, wherein OPC is referred to as a process of changing a layout by reflecting an error according to an optical proximity effect. Then, the mask may be manufactured according to a changed layout obtained via the OPC. The mask may be manufactured by using an OPC-reflected layout, for example, OPC-reflected GDSII.

In operation S470, the IC is manufactured using the mask. For example, a semiconductor device having an IC implemented therein is formed by performing various semiconductor processes on a semiconductor substrate, such as a wafer, by using a plurality of masks. For example, a process that uses a mask may mean a patterning process via a lithography. Via this patterning process, a desired pattern may be formed on the semiconductor substrate or a material layer. The various semiconductor processes may include a deposition process, an etching process, an ion process, and a cleaning process. The semiconductor processes may also include a packaging process of mounting a semiconductor device on a printed circuit board (PCB) and sealing the semiconductor device with a sealing material, and may also include a test process of testing a semiconductor device or a package.

Figure 23:
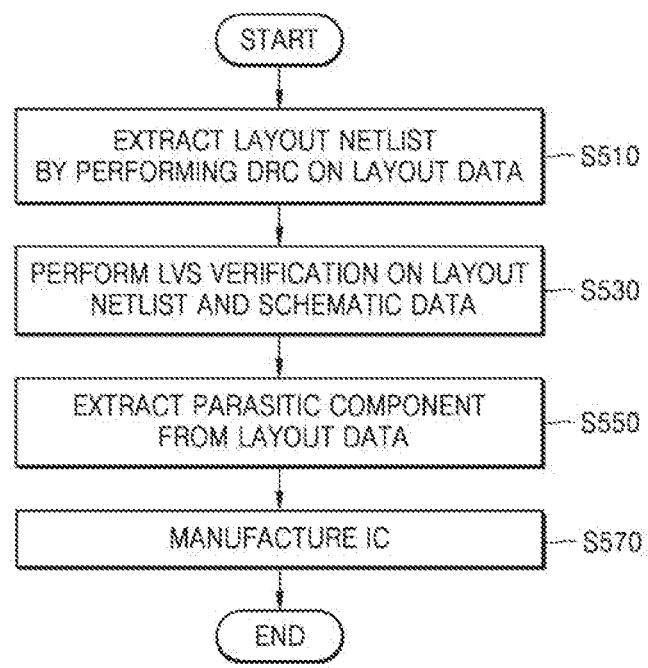
FIG. 23 is a flowchart of a method of manufacturing an 1C, according to an exemplary embodiment of the present inventive concept.

FIG. 23 is a flowchart of a method of manufacturing an IC, according to an exemplary embodiment of the present inventive concept.

Referring to FIG. 23, in operation S510, by performing DRC on layout data of the IC, connectivity between polygons is detected from the layout data, and a layout netlist is extracted. According to an exemplary embodiment of the present inventive concept, the operation of extracting the layout netlist may include an operation of detecting the connectivity by performing DRC on the layout data based on a rule file including a DRC syntax, and an operation of extracting the layout netlist from the layout data by using the detected connectivity. In operation S530, an LVS verification is performed on the layout netlist and schematic data to thereby generate LVS result data. In operation S550, a parasitic component is extracted from the layout data thus generating parasitic component data. In an exemplary embodiment of the present inventive concept, operation S550 may be omitted.

In operation S570, the IC is manufactured according to a layout based on the layout data. According to an exemplary embodiment of the present inventive concept, the IC manufacturing operation may include an operation of correcting the layout data based on the LVS result data, an operation of manufacturing a mask according to corrected layout data, and an operation of manufacturing the IC by using the mask. According to an exemplary embodiment of the present inventive concept, the IC manufacturing operation may include an operation of correcting the layout data based on the LVS result data and the parasitic component data, an operation of manufacturing a mask according to corrected layout data, and an operation of manufacturing the IC by using the mask.

Figure 24:
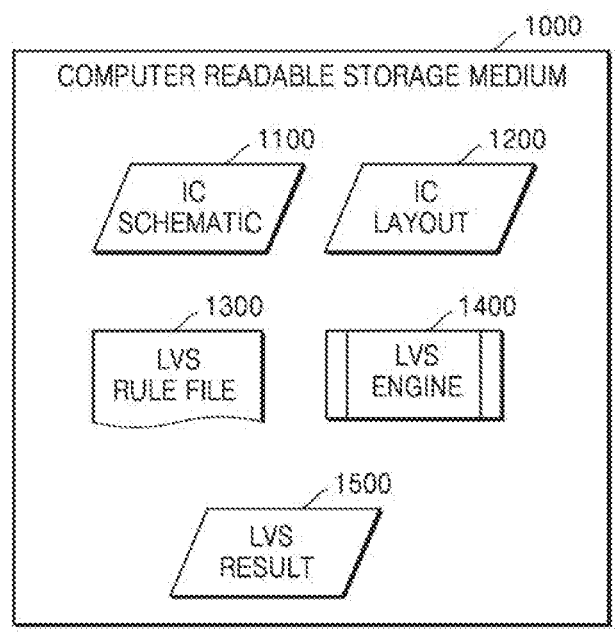
FIG. 24 is a block diagram of a computer-readable storage medium according to an exemplary embodiment of the present inventive concept.

FIG. 24 is a block diagram of a computer-readable storage medium according to an exemplary embodiment of the present inventive concept.

Referring to FIG. 24, a computer-readable storage medium 1000 may store schematic data 1100 of an IC, layout data 1200 of the IC, an LVS rule file 1300, an LVS engine 1400, and LVS result data 1500. The computer-readable storage medium 1000 may include an arbitrary storage medium readable by a computer while being used to provide instructions and/or data to the computer. For example, the computer-readable storage medium 1000 may include a magnetic or optical medium (such as a disk, a tape, a CD-ROM, a DVD-ROM, a CD-R, a CD-RW, a DVD-R, or a DVD-RW), volatile or non-volatile memory (such as, RAM, ROM, or flash memory), non-volatile memory accessible via a USB interface, and microelectromechanical systems (MEMSs). The computer-readable storage medium 1000 may be inserted into a computer, integrated into a computer, or combined with a computer via a communication medium, such as a network and/or a wireless link.

The schematic data 1100 of the IC may be data that defines the IC. For example, the schematic data 1100 of the IC may be the schematic data D20 (see, e.g., FIGS. 3, 9, and 10), or the schematic data 42 (see, e.g., FIG. 4B). The layout data 1200 of the IC may be topological data for defining the structure of an IC manufactured according to a semiconductor manufacturing process. For example, the layout data 1200 of the IC may be the layout data D10 (see, e.g., FIGS. 3, 9, and 10), the layout data 41 (see, e.g., FIG. 4A), the layout data 71 (see, e.g., FIG. 7A), the layout data 111 (see, e.g., FIG. 11A), the layout data 121 (see, e.g., FIG. 12A), the layout data D10a (see, e.g., FIG. 14), the layout data D10b (see, e.g., FIG. 15), the layout data 161 (see, e.g., FIG. 16), the layout data 171 (see, e.g., FIG. 17), the layout data 181 (see, e.g., FIG. 18), the layout data 191 (see, e.g., FIG. 19), the layout data 201 (see, e.g., FIG. 20A), the layout data 204 (see, e.g., FIG. 20B), or the layout data 211 (see, e.g., FIG. 21).

The LVS rule file 1300 is a file referred to when the LVS engine 1400 performs LVS verification, and may define a device to recognize and extract the device from the layout data 1200 of the IC. According to an exemplary embodiment of the present inventive concept, the LVS rule file 1300 may include a DRC syntax, and the DRC syntax may be implemented as a DRC loop syntax by using a loop algorithm. For example, the DRC syntax may include for each Tel. For example, the LVS rule file 1300 may be the LVS rule file D30 (see, e.g., FIGS. 3, 9, and 10), the LVS rule file 51 (see, e.g., FIG. 5), the LVS rule file 113 (see, e.g., FIG. FIG. 11B), the LVS rule file 123 (see, e.g., FIG. 12B), the LVS rule file 131 (see, e.g., FIG. 13), the LVS rule file D30a (see, e.g., FIG. 14), the LVS rule file D30b (see, e.g., FIG. 15), the LVS rule file 162 (see, e.g., FIG. 16), the LVS rule file 172 (see, e.g., FIG. 17), the LVS rule file 182 (see, e.g., FIG. 18), the LVS rule file 192 (see, e.g., FIG. 19), or the LVS rule file 202 (see, e.g., FIGS. 20A and 20B).

The LVS engine 1400 may automatically detect connectivity between polygons from the layout data 1200 of the IC, based on the LVS rule file 1300, extract a layout netlist from the layout data 1200 of the IC by using the detected connectivity, and compare the extracted layout netlist with the schematic data 1100 of the IC to generate the LVS result data 1500. For example, the LVS engine 1400 may be the LVS engine 130c (see, e.g., FIG. 2), the LVS engine 30 (see, e.g., FIG. 3), the LVS engine 90 (see, e.g., FIG. 9), or the LVS engine 90a (see, e.g., FIG. 10).

The LVS engine 1400 may include a plurality of instructions for performing LVS verification, and a computing system or a processor included in the computing system may perform LVS verification by executing the plurality of instructions included in the LVS engine 1400. According to an exemplary embodiment of the present inventive concept, the LVS engine 1400 may include a design rule checker for performing DRC. According to an exemplary embodiment of the present inventive concept, the computer-readable storage medium 1000 may further store a DRC engine, and the DRC engine may generate DRC result data by automatically detecting the connectivity between the polygons from the layout data 1200 of the IC by using the LVS rule file 1300.

Figure 25:
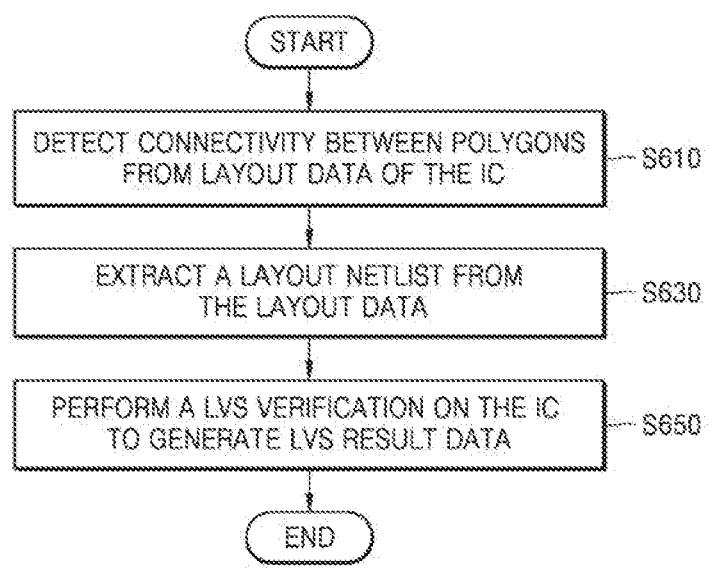
FIG. 25 is a flowchart of a method of testing a layout of an IC, according to an exemplary embodiment of the present inventive concept.

FIG. 25 is a flowchart of a method of testing a layout of an IC, according to an exemplary embodiment of the present inventive concept.

Referring to FIG. 25, according to another exemplary embodiment of the present inventive concept, a method of testing a layout of an integrated circuit (IC) includes detecting connectivity between polygons from layout data of the IC, based on a rule file including design rule check (DRC) syntax (Step S610). A layout netlist is extracted from the layout data by using the detected connectivity (Step S630). A Layout-Versus-Schematic (LVS) verification is performed on the IC to generate LVS result data, by comparing schematic data of the IC with the layout netlist (Step S650).

The various operations of methods described above may be performed by any suitable means capable of performing the operations, such as various hardware and/or software component(s), circuits, and/or module(s). The software may comprise an ordered listing of executable instructions for implementing logical functions, and can be embodied in any processor-readable medium for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the present inventive concept has been particularly shown and described with reference to exemplary embodiments thereof, it will be understood that various changes in form and details may be made therein without departing from the spirit and scope of the present inventive concept.

What is claimed is:

1. A method of manufacturing an integrated circuit (IC), the method comprising:
   detecting connectivity between polygons from layout data of the IC, based on a rule file including design rule check (DRC) syntax, wherein the DRC syntax comprises instructions to perform a DRC on layers of the layout data, by executing a Layout-Versus-Schematic (LVS) engine by a processor;
   generating a DRC result including one or more connectivity statements based on the detected connectivity, by executing the LVS engine by the processor;
   extracting a layout netlist based on the connectivity statements in the DRC result, by executing the LVS engine by the processor,
   performing LVS verification on the extracted layout netlist and schematic data of the IC to generate LVS result data, by executing the LVS engine by the processor; and
   manufacturing the IC according to a layout based on the layout data and the LVS result data.

2. The method of claim 1, wherein the rule file does not include connectivity statements.

3. The method of claim 1, further comprising, after the generating of the LVS result data, extracting a parasitic component from the layout data to generate parasitic component data, by executing the LVS engine by the processor.

4. The method of claim 3, wherein the manufacturing of the IC comprises:
   correcting the layout data, based on the LVS result data and the parasitic component data;

manufacturing a mask according to the corrected layout
data; and
manufacturing the IC by using the mask.

5. The method of claim 1, further comprising:
determining that two polygons are not actually connected based on a DRC loop syntax, by executing the LVS engine by the processor; and
terminating a connectivity detection performed according to the DRC loop syntax based on the determination, by executing the LVS engine by the processor.

6. A computer-implemented method of designing an integrated circuit (IC), the computer-implemented method comprising:
detecting connectivity between polygons from layout data of the IC, based on a rule file including design rule check (DRC) syntax, wherein the DRC syntax comprises instructions to perform a DRC on layers of the layout data, by executing the LVS engine by the processor
generating a DRC result including one or more connectivity statements based on the detected connectivity, by executing the LVS engine by the processor;
extracting a layout netlist based on the connectivity statements in the DRC result by executing the LVS engine by the processor; and
performing LVS verification on the IC to generate LVS result data, by comparing schematic data of the IC with the layout netlist, by the processor.

7. The computer-implemented method of claim 6, wherein the rule file further comprises definitions of a plurality of layers included in the layout data, and definitions of a plurality of polygons included in each of the plurality of layers.

8. The computer-implemented method of claim 7, wherein the DRC syntax is DRC loop syntax configured to check connectivity for each of the plurality of layers and for each of the plurality of polygons.

9. The computer-implemented method of claim 6, wherein
the layout data comprises a first layer and a second layer, the second layer being on the first layer, and
the DRC syntax comprises a first syntax configured to check whether at least one first polygon included in the first layer and at least one second polygon included in the second layer touch each other.

10. The computer-implemented method of claim 6, wherein
the layout data comprises a first layer, a via layer on the first layer, and a second layer on the via layer, and
the DRC syntax comprises a second syntax configured to check whether at least one first polygon included in the first layer, at least one second polygon included in the second layer, and at least one third polygon included in the via layer touch each other.

11. The computer-implemented method of claim 6, wherein
the layout data comprises a first layer, and
the DRC syntax comprises a first syntax configured to check whether first and second polygons included in the first layer touch each other.

12. The computer-implemented method of claim 6, wherein
the layout data comprises a first layer, and
the DRC syntax comprises a third syntax configured to check whether first and second polygons included in the first layer overlap each other.

13. The computer-implemented method of claim 6, wherein the detecting of the connectivity between the polygons from the layout data of the IC comprises generating DRC result data regarding connectivity between actually-connected polygons in the layout data by performing DRC verification on the layout data according to the DRC syntax.

14. The computer-implemented method of claim 6, wherein
the layout data comprises a first layer divided into at least one polygon, and
the DRC syntax comprises a fourth syntax configured to check whether a polygon not defined as the at least one polygon exists on the first layer.

15. The computer-implemented method of claim 6, wherein the DRC syntax comprises a fifth syntax configured to check a floating net of the layout data.

16. The computer-implemented method of claim 6, wherein the connectivity between the polygons is omitted in the rule file.

17. The computer-implemented method of claim 6, further comprising generating parasitic component data by extracting a parasitic component from the layout data for which the LVS verification has been completed, by executing the LVS engine by the processor.

18. A computing system for designing an integrated circuit (IC), the computing system comprising:
a memory configured to store a Layout-Versus-Schematic (LVS) engine for performing LVS verification on the IC; and
a processor configured to access the memory and execute the LVS engine,
wherein the LVS engine detects connectivity between polygons from layout data of the IC, based on a rule file including design rule check (DRC) syntax, wherein the DRC syntax comprises instructions to perform a DRC on layers of the layout data, generates a DRC result including one or more connectivity statements based on the detected connectivity, extracts a layout netlist based on the connectivity statements in the DRC result, and compares the extracted layout netlist with schematic data of the IC.

19. The computing system of claim 18, wherein the memory is further configured to store a parasitic component extractor that generates parasitic component data by extracting a parasitic component from the layout data for which the LVS verification has been completed.

20. The computing system of claim 18, wherein
the layout data comprises a first layer and a second layer, the second layer being on the first layer, and
the DRC syntax comprises at least one of:
a first syntax configured to check whether at least one first polygon included in the first layer and at least one second polygon included in the second layer touch each other;
a second syntax configured to check whether the at least one first polygon included in the first layer, the at least one second polygon included in the second layer, and at least one third polygon included in a via layer between the first and second layers touch each other;
a third syntax configured to check whether polygons respectively included in the first and second layers overlap each other;
a fourth syntax configured to check whether additional polygons not defined as any of the at least one first polygon and the at least one second polygon exist on the first and second layers; and a fifth syntax configured to check a floating net from the layout data.

\* \* \* \* \*